US011411234B2

United States Patent
Fujita et al.

(10) Patent No.: US 11,411,234 B2
(45) Date of Patent: Aug. 9, 2022

(54) FUEL CELL SYSTEM AND METHOD FOR DETECTING ABNORMALITY OF FUEL CELL SYSTEM

(71) Applicant: TOYOTA JIDOSHA KABUSHIKI KAISHA, Toyota (JP)

(72) Inventors: Keisuke Fujita, Susono (JP); Toshihiro Egawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 17/084,932

(22) Filed: Oct. 30, 2020

(65) Prior Publication Data

US 2021/0143458 A1    May 13, 2021

(30) Foreign Application Priority Data

Nov. 11, 2019  (JP) .............................. JP2019-203758

(51) Int. Cl.

| H01M 8/04664 | (2016.01) |
|---|---|
| H01M 8/04082 | (2016.01) |
| H01M 8/0438 | (2016.01) |
| H01M 8/0432 | (2016.01) |
| H01M 8/04992 | (2016.01) |

(52) U.S. Cl.
CPC ... *H01M 8/04686* (2013.01); *H01M 8/04201* (2013.01); *H01M 8/04373* (2013.01); *H01M 8/04425* (2013.01); *H01M 8/04432* (2013.01); *H01M 8/04992* (2013.01)

(58) Field of Classification Search
CPC ......... H01M 8/04313; H01M 8/04373; H01M 8/04425; H01M 8/04664; H01M 8/04686; H01M 8/04201; H01M 8/04992
See application file for complete search history.

(56) References Cited

U.S. PATENT DOCUMENTS

| 2010/0276031 A1 | 11/2010 | Saiki et al. |
| 2016/0116450 A1 | 4/2016 | Saito |
| 2018/0183077 A1 | 6/2018 | Ohkuwa et al. |
| 2020/0411886 A1* | 12/2020 | Fukunaga ............... F17C 13/02 |

FOREIGN PATENT DOCUMENTS

| JP | 2010236673 A | 10/2010 |
| JP | 2016084844 A | 5/2016 |
| JP | 2018106867 A | 7/2018 |

* cited by examiner

*Primary Examiner* — Christopher P Domone
(74) *Attorney, Agent, or Firm* — Hunton Andrews Kurth LLP

(57) ABSTRACT

The present disclosure relates to a fuel cell system. In abnormality detection control, a control unit of the fuel cell system obtains a maximum filling pressure that is a maximum value of the pressure in a filling flow path during filling, and determines that both of first and second pressure sensors are normal when the difference between a supply start pressure and the maximum filling pressure is equal to or smaller than a reference value. When this difference is larger than the reference value, the control unit determines that there is a possibility that at least one of the first and second pressure sensors may be abnormal. The supply start pressure is a detection value of the second pressure sensor at the time when supply of fuel gas to a fuel cell is started for the first time after filling of a fuel tank with the fuel gas is finished.

9 Claims, 11 Drawing Sheets

FUEL CELL SYSTEM AND METHOD FOR DETECTING ABNORMALITY OF FUEL CELL SYSTEM

INCORPORATION BY REFERENCE

The disclosure of Japanese Patent Application No. 2019-203758 filed on Nov. 11, 2019 including the specification, drawings and abstract is incorporated herein by reference in its entirety.

BACKGROUND

1. Technical Field

The present disclosure relates to a fuel cell system and a method for detecting an abnormality of a fuel cell system.

2. Description of Related Art

Fuel cell systems including a hydrogen tank that stores hydrogen to be supplied to a fuel cell is typically provided with a pressure sensor for detecting the pressure in the hydrogen tank. As is known in the art, some of such fuel cell systems have two separate pressure sensors, one on a filling flow path through which hydrogen is supplied to the hydrogen tank and the other on a supply flow path through which hydrogen to be supplied to the fuel cell is discharged from the hydrogen tank. These fuel cell systems determine whether there is an abnormality in the pressure sensors by comparing the pressure detected by the pressure sensor on the filling flow path when an operation of filling the hydrogen tank with hydrogen is completed and the pressure detected by the pressure sensor on the supply flow path when supply of hydrogen to the fuel cell is started for the first time after filling (see, for example, Japanese Unexamined Patent Application Publication No. 2018-106867 (JP 2018-106867 A)).

SUMMARY

The inventors found that such fuel cell systems have the following new problem. Such fuel cell systems include a receptacle provided at the end of the filling flow path, and a hydrogen fueling device is attached to the receptacle when filling the hydrogen tank with hydrogen. In these fuel cell systems, the pressure in the filling flow path may decrease after filling of the hydrogen tank due to, for example, foreign matter caught in the receptacle. In such a case, the fuel cell system may not be able to accurately determine whether there is an abnormality in the pressure sensors even by comparing the pressure detected by the pressure sensor on the filling flow path after filling of the hydrogen tank and the pressure detected by the pressure sensor on the supply flow path at the start of supply of hydrogen to the fuel cell.

(1) A first aspect of the present disclosure relates to a fuel cell system including: a fuel cell; a fuel tank that stores fuel gas to be supplied to the fuel cell; a filling flow path through which the fuel gas to be supplied to the fuel tank flows; a supply flow path connecting the fuel cell and the fuel tank; a first pressure sensor that is mounted on the filling flow path and that detects a pressure in the filling flow path; a second pressure sensor that is mounted on the supply flow path and that detects a pressure of the fuel gas at an outlet of the fuel tank; a temperature sensor that detects a temperature in the fuel tank; and a control unit configured to perform abnormality detection control for the first pressure sensor and the second pressure sensor. In the abnormality detection control, the control unit is configured to: obtain a maximum filling pressure from a detection value of the first pressure sensor, the maximum filling pressure being the pressure in the filling flow path at a maximum pressure time when the pressure in the filling flow path becomes maximum during filling of the fuel tank with the fuel gas; determine that both the first pressure sensor and the second pressure sensor are normal when a first difference is equal to or smaller than a predetermined first reference value or when a second difference is equal to or smaller than a predetermined second reference value, the first difference being a difference between a supply start pressure and the maximum filling pressure, the supply start pressure being a detection value of the second pressure sensor at a start of supply of the fuel gas to the fuel cell that is when supply of the fuel gas from the fuel tank to the fuel cell is started for a first time after filling of the fuel tank with the fuel gas is finished, and the second difference being a difference between an amount of the fuel gas in the fuel tank at the start of supply of the fuel gas to the fuel cell, which is calculated using the temperature detected by the temperature sensor at the start of supply of the fuel gas to the fuel cell and the supply start pressure, and an amount of the fuel gas in the fuel tank at the maximum pressure time, which is calculated using the temperature detected by the temperature sensor at the maximum pressure time and the maximum filling pressure; and determine that there is a possibility that at least one of the first pressure sensor and the second pressure sensor are abnormal when the first difference is larger than the predetermined first reference value or when the second difference is larger than the predetermined second reference value. According to the fuel cell system of this aspect, even when the pressure in the filling flow path decreases after the fuel tank is filled with the fuel gas, the maximum filling pressure is closer to the pressure in the fuel tank at the end of filling, and the difference between the supply start pressure and the maximum filling pressure is more likely to be equal to or smaller than the reference value. This configuration thus reduces the possibility of erroneous abnormality determination for the pressure sensors.

(2) The fuel cell system of the above aspect may further include a flow rate sensor that detects a flow rate of the fuel gas flowing through the filling flow path. The control unit may be configured to start the abnormality detection control once the flow rate detected by the flow rate sensor becomes equal to or lower than a predetermined reference flow rate after the start of filling of the fuel tank with the fuel gas. With this configuration, accuracy of abnormality determination for the pressure sensors is improved as the abnormality detection control is started using the detection value of the flow rate of the fuel gas flowing through the filling flow path.

(3) The predetermined reference flow rate may be 30 g/sec. The accuracy of abnormality determination for the pressure sensors is thus improved as the abnormality detection control is started using the detection value of the flow rate of the fuel gas flowing through the filling flow path.

(4) The control unit may be configured to obtain a pressure increase rate of the filling flow path during filling of the fuel tank with the fuel gas by using the detection value of the first pressure sensor, and start the abnormality detection control after the pressure increase rate becomes equal to or lower than a predetermined first reference rate after the start of filling of the fuel tank with the fuel gas. With this configuration, the accuracy of abnormality determination for the pressure sensors is improved as the abnormality detection control is started using the pressure increase rate of the fuel gas flowing through the filling flow path.

(5) The predetermined first reference rate may be 23 MPa/min. The accuracy of abnormality determination for the pressure sensors is thus improved as the abnormality detection control is started using the pressure increase rate of the fuel gas flowing through the filling flow path.

(6) The control unit may be configured to obtain a temperature increase rate of the fuel tank during filling of the fuel tank with the fuel gas by using the temperature detected by the temperature sensor, and start the abnormality detection control after the temperature increase rate becomes equal to or lower than a predetermined second reference rate after the start of filling of the fuel tank with the fuel gas. With this configuration, the accuracy of abnormality determination for the pressure sensors is improved as the abnormality detection control is started using the temperature increase rate of the fuel tank.

(7) The predetermined second reference rate may be 20° C./min. The accuracy of abnormality determination for the pressure sensors is thus improved as the abnormality detection control is started using the temperature increase rate of the fuel tank.

(8) The control unit may be configured to obtain the maximum filling pressure at the maximum pressure time, the maximum pressure time being a time when the detection value of the first pressure sensor becomes maximum after a pressure loss that occurs between the first pressure sensor and the fuel tank when the fuel gas flows through the filling flow path is estimated to become equal to or lower than a predetermined determination value. This configuration reduces the possibility that an excessively large value may be obtained as the maximum filling pressure due to the pressure loss in the filling flow path and thus reduces the possibility that the pressure sensors are erroneously determined to be abnormal even though the pressure sensors are normal. The accuracy of abnormality determination for the pressure sensors is thus improved.

(9) A second aspect of the disclosure relates to a method for detecting an abnormality of a fuel cell system. The fuel cell system includes a fuel cell, a fuel tank that stores fuel gas to be supplied to the fuel cell, a filling flow path through which the fuel gas to be supplied to the fuel tank flows, a supply flow path connecting the fuel cell and the fuel tank, a first pressure sensor that is mounted on the filling flow path and that detects a pressure in the filling flow path, and a second pressure sensor that is mounted on the supply flow path and that detects a pressure of the fuel gas at an outlet of the fuel tank. The method includes: obtaining a maximum filling pressure from a detection value of the first pressure sensor, the maximum filling pressure being the pressure in the filling flow path at a maximum pressure time when the pressure in the filling flow path becomes maximum during filling of the fuel tank) with the fuel gas; determining that both the first pressure sensor and the second pressure sensor are normal when a first difference is equal to or smaller than a predetermined first reference value or when a second difference is equal to or smaller than a predetermined second reference value, the first difference being a difference between a supply start pressure and the maximum filling pressure, the supply start pressure being a detection value of the second pressure sensor at a start of supply of the fuel gas to the fuel cell that is when supply of the fuel gas from the fuel tank to the fuel cell is started for a first time after filling of the fuel tank with the fuel gas is finished, and the second difference being a difference between an amount of the fuel gas in the fuel tank at the start of supply of the fuel gas to the fuel cell, which is calculated using a temperature in the fuel tank at the start of supply of the fuel gas to the fuel cell and the supply start pressure, and an amount of the fuel gas in the fuel tank at the maximum pressure time, which is calculated using a temperature in the fuel tank at the maximum pressure time and the maximum filling pressure; and determining that there is a possibility that at least one of the first pressure sensor and the second pressure sensor are abnormal when the first difference is larger than the predetermined first reference value or when the second difference is larger than the predetermined second reference value.

The present disclosure may be implemented in various forms other than the fuel cell system and the method for detecting an abnormality of a fuel cell system. For example, the present disclosure may be implemented in forms such as fuel cell vehicles equipped with the fuel cell system, computer programs that implement the method, and non-transitory storage media having the computer program stored therein.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment (A-1) Overall Configuration

Figure 1:
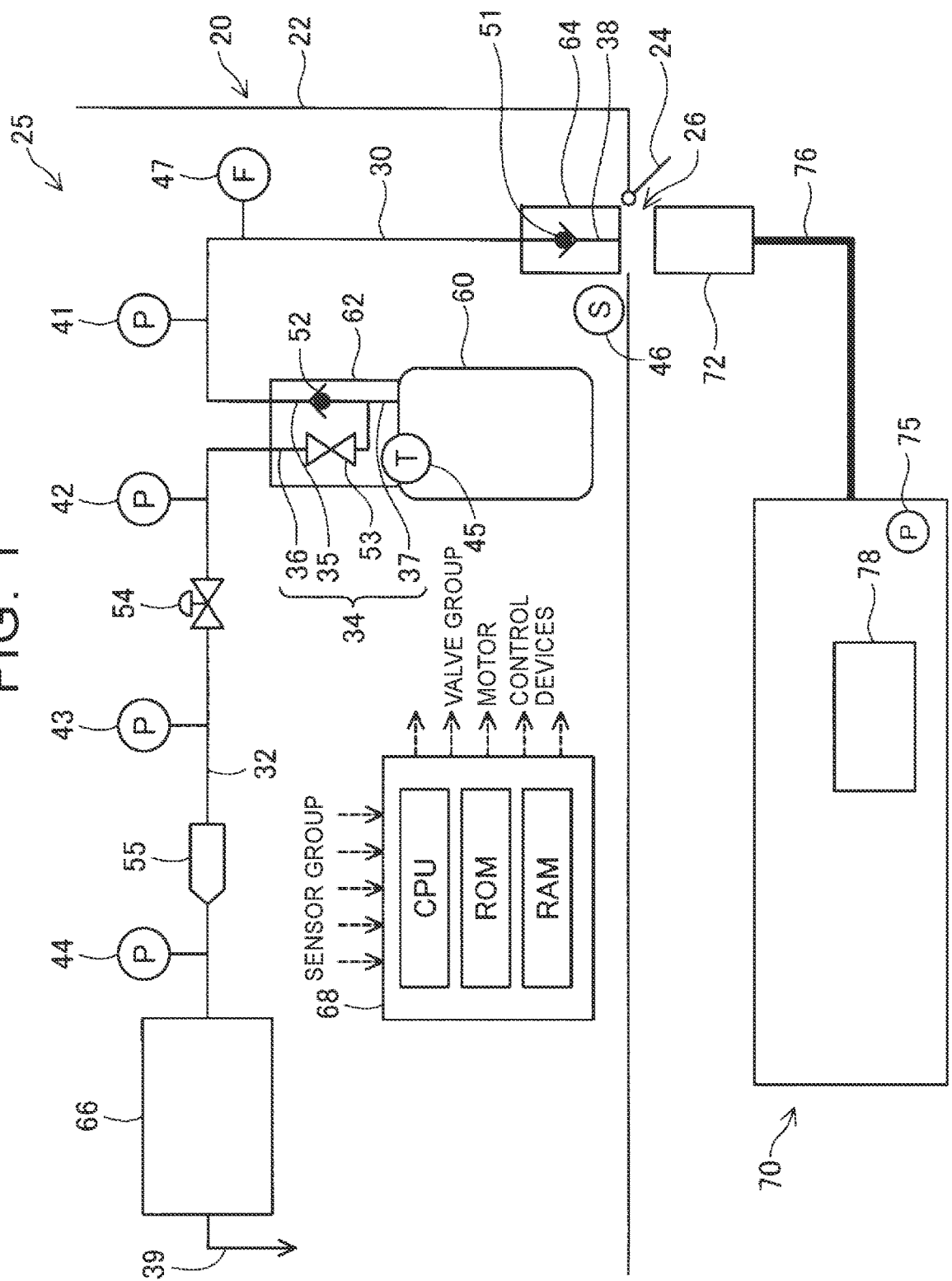
FIG. 1 illustrates the general configuration of a fuel cell system.

FIG. 1 illustrates the general configuration of a fuel cell system 25 of a first embodiment of the present disclosure. The fuel cell system 25 is mounted on a fuel cell vehicle 20. FIG. 1 also illustrates a hydrogen fueling device 70 for filling a fuel tank 60 with hydrogen that is fuel gas. The fuel tank 60 is included in the fuel cell system 25 and will be described later. The configurations of the fuel cell vehicle 20 and the hydrogen fueling device 70 will be described.

The fuel cell system 25 is a system for generating electricity to be used by a drive motor, not shown, mounted on the fuel cell vehicle 20. The fuel cell system 25 includes a fuel cell 66, the fuel tank 60, a receptacle 64, a filling pipe 30, a supply pipe 32, and a control unit 68. The fuel tank 60 and the receptacle 64 are connected by the filling pipe 30, and the fuel tank 60 and the fuel cell 66 are connected by the supply pipe 32. FIG. 1 illustrates only a part relating to the flow of hydrogen out of the configuration of the fuel cell vehicle 20. Although the fuel cell vehicle 20 further includes a structure for causing oxidizing gas containing oxygen to flow through the fuel cell 66, a structure for causing a cooling medium to flow through the fuel cell 66, and a structure relating to driving of the drive motor, description of these structures will be omitted.

The fuel cell 66 is an electric generator for generating electricity from an electrochemical reaction between fuel gas and oxidizing gas, and has a stacked structure of a plurality of single cells. Although the fuel cell 66 of the present embodiment is a polymer electrolyte fuel cell, the fuel cell 66 may be other type of fuel cell such as a solid oxide fuel cell. In each single cell that forms the fuel cell 66, a flow path through which hydrogen that is fuel gas flows (hereinafter also referred to as the anode-side flow path) is formed on the anode side, and a flow path through which air that is oxidizing gas flows (hereinafter also referred to as the cathode-side flow path) is formed on the cathode side, with an electrolyte membrane interposed between the anode-side flow path and the cathode-side flow path.

The fuel tank 60 is a device for storing hydrogen to be supplied to the fuel cell 66. For example, the fuel tank 60 is a resin tank having a fiber reinforced plastic (FRP) layer on the outer surface of a resin liner. The FRP layer is formed by winding fibers containing a thermosetting resin around the resin liner. The fuel tank 60 includes a valve mechanism 62 placed in a boss of the fuel tank 60. The valve mechanism 62 has an in-valve flow path 34 formed therein. The in-valve flow path 34 includes a first flow path 35, a second flow path 36, and a third flow path 37. One end of the first flow path 35 is open at a surface of the valve mechanism 62, and the filling pipe 30 is connected to the one end of the first flow path 35. A second check valve 52 is disposed in the first flow path 35. The second check valve 52 allows hydrogen to flow only in the direction from the filling pipe 30 toward the fuel tank 60. The other end of the first flow path 35 is connected to one end of the third flow path 37. One end of the second flow path 36 is open at the surface of the valve mechanism 62, and the supply pipe 32 is connected to the one end of the second flow path 36. A main stop valve 53 is disposed in the second flow path 36. The main stop valve 53 is a solenoid valve that opens and closes the second flow path 36. The other end of the second flow path 36 is connected to the one end of the third flow path 37. The other end of the third flow path 37 is open in the fuel tank 60. The third flow path 37 into which the first flow path 35 and the second flow path 36 merge may not be provided, and the first flow path 35 and the second flow path 36 may separately communicate with the fuel tank 60. The fuel tank 60 further includes a temperature sensor 45 that detects the temperature in the fuel tank 60.

The receptacle 64 is a structure for connecting the hydrogen fueling device 70 to the fuel cell vehicle 20 when filling the fuel tank 60 with hydrogen. The receptacle 64 is mounted on a side surface of a vehicle body 22 of the fuel cell vehicle 20. The receptacle 64 has a fourth flow path 38 formed therein. One end of the fourth flow path 38 is connected to the filling pipe 30. The other end of the fourth flow path 38 is open at a surface of the vehicle body 22 and forms a filling port 26 into which hydrogen supplied from the hydrogen fueling device 70 flows. A first check valve 51 is disposed in the fourth flow path 38. The first check valve 51 allows hydrogen to flow only in the direction from the filling port 26 toward the filling pipe 30.

A lid 24 that covers the receptacle 64 is provided on the vehicle body 22. The lid 24 is attached to the vehicle body 22 via a hinge such that the lid 24 can be opened and closed. The lid 24 is opened when filling the fuel tank 60 with hydrogen by the hydrogen fueling device 70. A lid sensor 46 for detecting whether the lid 24 is open or closed is mounted near the receptacle 64.

In the configuration shown in FIG. 1, a flow path connecting the filling port 26 and the fuel tank 60, that is, a flow path through which hydrogen supplied from the filling port 26 flows into the fuel tank 60, is also referred to as the "filling flow path." In the present embodiment, the "filling flow path" includes the filling pipe 30, the first flow path 35, the third flow path 37, and the fourth flow path 38. In the present embodiment, a filling pressure sensor 41 and a flow rate sensor 47 are mounted on the filling pipe 30. The filling pressure sensor 41 detects the pressure in the filling pipe 30, and the flow rate sensor 47 detects the mass flow rate of hydrogen flowing in the filling pipe 30. The filling pressure sensor 41 is also referred to as the "first pressure sensor."

When filling the fuel tank 60 with hydrogen, a nozzle 72, described later, of the hydrogen fueling device 70 is connected to the receptacle 64, and hydrogen is supplied from the hydrogen fueling device 70 to the fuel tank 60 through the nozzle 72, the receptacle 64, and the filling flow path. At this time, since high pressure hydrogen is supplied from the hydrogen fueling device 70, the first check valve 51 and the second check valve 52 are opened. When filling the fuel tank 60 with hydrogen, the main stop valve 53 in the valve mechanism 62 is closed. The pressure that is detected by the filling pressure sensor 41 during filling of the fuel tank 60 with fuel gas is therefore approximately equal to the pressure in the fuel tank 60. Hereinafter, the pressure in the fuel tank 60 is also simply referred to as the "tank pressure."

In the configuration shown in FIG. 1, a flow path connecting the fuel cell 66 and the fuel tank 60, that is, a flow path through which hydrogen discharged from the fuel tank 60 is supplied to the fuel cell 66, is also referred to as the "supply flow path." In the present embodiment, the "supply flow path" includes the supply pipe 32, the second flow path 36, and the third flow path 37. A pressure reducing valve 54 and an injector 55 are mounted on the supply pipe 32 in this order from the upstream side of the hydrogen flow. The injector 55 has a solenoid valve therein and adjusts the amount of hydrogen that is supplied to the fuel cell 66 by opening and closing operation of the solenoid valve. In order to cause the fuel cell 66 to generate electricity, the main stop valve 53 is opened to cause high pressure hydrogen from the fuel tank 60 to flow into the supply pipe 32. The pressure of the high pressure hydrogen flowing in the supply pipe 32 is reduced by the pressure reducing valve 54 and supplied from the injector 55 into the anode-side flow paths in the fuel cell 66.

In the supply flow path, a high pressure sensor 42 is mounted between the main stop valve 53 and the pressure reducing valve 54, a medium pressure sensor 43 is mounted between the pressure reducing valve 54 and the injector 55, and a low pressure sensor 44 is mounted between the injector 55 and the fuel cell 66. During power generation of the fuel cell 66, the detection value of the high pressure sensor 42 is the largest, followed by the detection value of the medium pressure sensor 43 and the detection value of the low pressure sensor 44. The detection values of the high pressure sensor 42, the medium pressure sensor 43, and the low pressure sensor 44 are used to control the amount of hydrogen that is supplied to the fuel cell 66 during power generation of the fuel cell 66. In order to cause the fuel cell 66 to generate electricity, the main stop valve 53 is opened. The pressure that is detected by the high pressure sensor 42 at this time is approximately equal to the tank pressure. The high pressure sensor 42 is mounted upstream of the pressure reducing valve 54 that is a device for reducing the pressure of fuel gas and the injector 55, and the gas pressure that is detected by the high pressure sensor 42 can be said to be the "pressure of the fuel gas at the outlet of the fuel tank 60." The high pressure sensor 42 is also referred to as the "second pressure sensor."

An exhaust pipe 39 is also connected to the fuel cell 66. The exhaust pipe 39 is a pipe through which anode off-gas having flowed through the anode-side flow paths in the fuel cell 66 is discharged from the fuel cell 66. The downstream side of the exhaust pipe 39 may be connected to the supply pipe 32 between the injector 55 and the fuel cell 66 to supply anode off-gas discharged from the fuel cell 66 back into the fuel cell 66. Namely, a flow path for circulating fuel gas may be formed.

The control unit 68 is composed of what is called a microcomputer including a CPU that performs logical operations, a ROM, a RAM, etc. The control unit 68 receives detection signals from various sensors and performs various controls for the fuel cell vehicle 20. The various sensors include: pressure sensors such as the filling pressure sensor 41, the high pressure sensor 42, the medium pressure sensor 43, and the low pressure sensor 44, the temperature sensor 45, the lid sensor 46; and the flow rate sensor 47, which are described above, and sensors, not shown, such as an accelerator pedal position sensor, a shift position sensor, and a vehicle speed sensor. Specifically, the control unit 68 outputs drive signals to the various valves described above, the drive motor, various control devices, etc. The control unit 68 may not be a single control unit that performs all of the following controls: control of hydrogen fueling operation; control related to detection of an abnormality of the pressure sensors, which will be described later; and control of driving operation of the vehicle. The control unit 68 may be composed of separate control units (electronic control units (ECUs)) that separately perform these controls and that send and receive information to and from each other.

The hydrogen fueling device 70 is a device for filling the fuel tank 60 of the fuel cell vehicle 20 with hydrogen and can be provided at, for example, hydrogen stations. The hydrogen fueling device 70 includes a hydrogen storage unit, not shown, that stores high pressure hydrogen, a hydrogen dispenser hose 76 that guides high pressure hydrogen from the hydrogen storage unit, the nozzle 72 provided at the tip end of the hydrogen dispenser hose 76, a station pressure sensor 75, and a control unit 78. The nozzle 72 is a structure that is connected to the receptacle 64 of the fuel cell vehicle 20 when filling the fuel tank 60 with hydrogen, and is a structure that connects a hydrogen flow path on the hydrogen fueling device 70 side, which is open at the nozzle 72, to the filling flow path of the fuel cell vehicle 20. The station pressure sensor 75 detects the pressure of hydrogen that is supplied from the hydrogen fueling device 70 to the fuel tank 60. When the nozzle 72 is connected to the receptacle 64 and a hydrogen flow path in the hydrogen fueling device 70 communicates with the fuel tank 60 to fill the fuel tank 60 with hydrogen, the station pressure sensor 75 is ready to detect the tank pressure. The control unit 78 is composed of a microcomputer including a CPU that performs logical operations, a ROM, a RAM, etc. During filling with hydrogen, the control unit 78 can control the flow rate etc. of hydrogen that is supplied to the fuel cell vehicle 20 by using the tank pressure detected by the station pressure sensor 75. The hydrogen fueling device 70 further includes a pre-cooler, not shown, that cools hydrogen to a predetermined temperature before filling. When filling the fuel tank 60 with hydrogen, the temperature in the fuel tank 60 increases due to a phenomenon like what is called adiabatic compression. An excessive increase in temperature in the fuel tank 60 is restrained by cooling hydrogen before filling.

Although not shown in FIG. 1, the fuel cell vehicle 20 and the hydrogen fueling device 70 may be provided with a communication device that sends information on filling of the fuel tank 60 with hydrogen, such as information including the tank pressure, between the fuel cell vehicle 20 and the hydrogen fueling device 70. For example, such a communication device may be a device for sending the above information from the fuel cell vehicle 20 to the hydrogen fueling device 70 by infrared communication.

(A-2) Operation of Detecting Abnormality of Pressure Sensors

Figure 2:
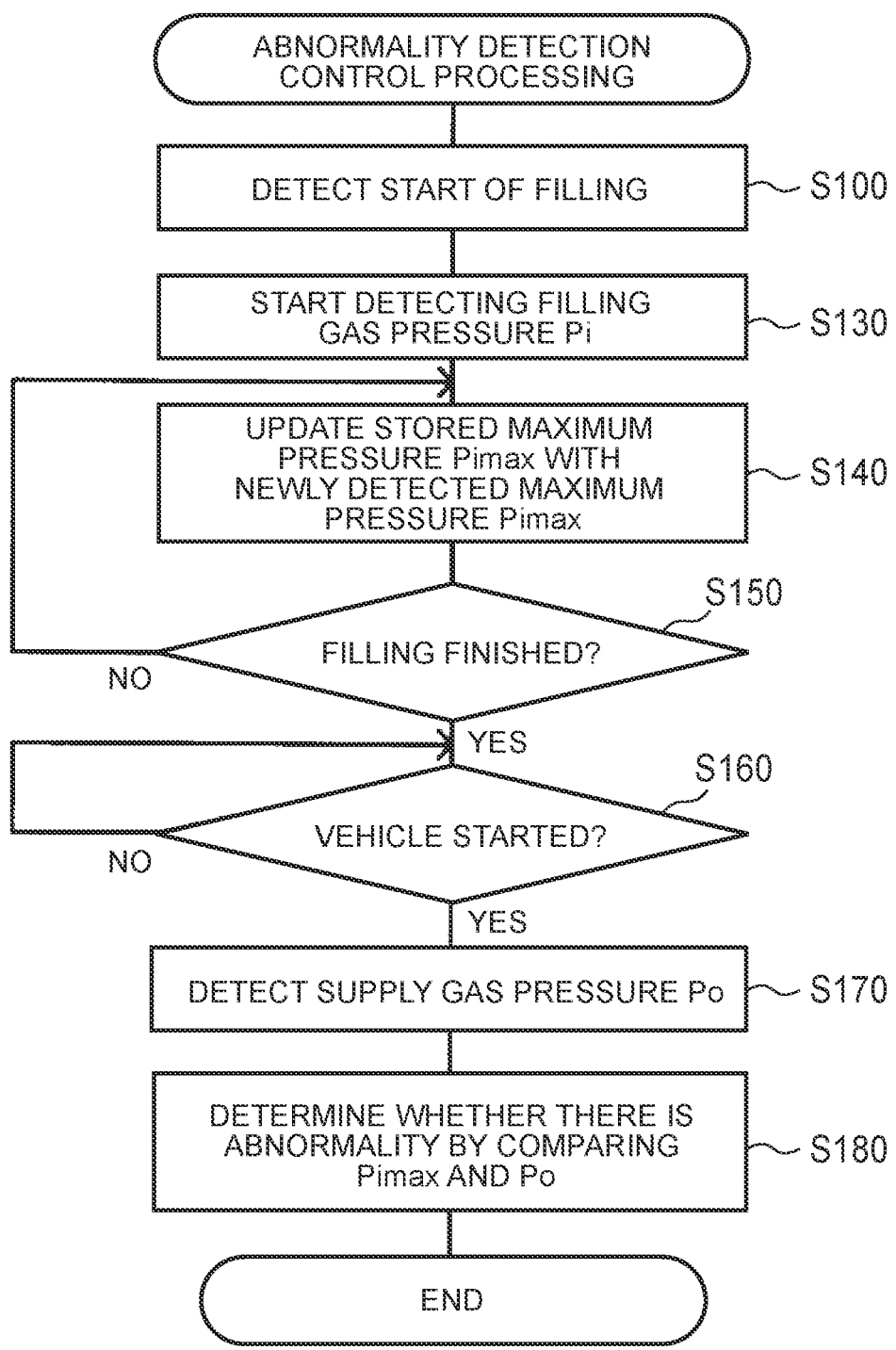
FIG. 2 is a flowchart of an abnormality detection control routine.
Figure 3:
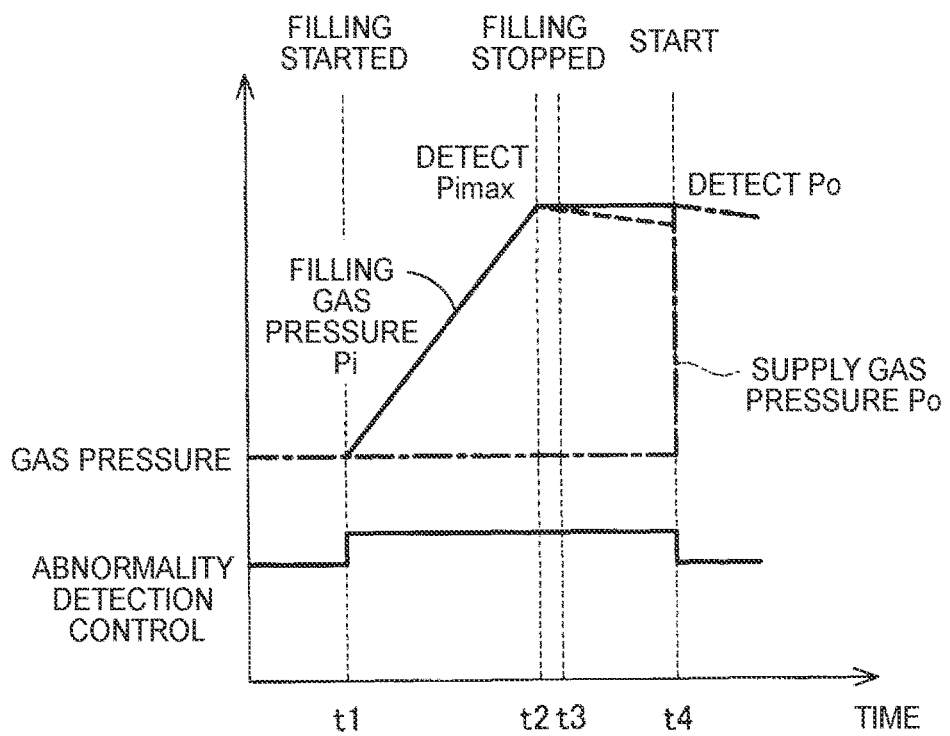
FIG. 3 is a timing chart illustrating the overview of operations associated with abnormality detection control.

FIG. 2 is a flowchart of an abnormality detection control routine that is executed by the CPU of the control unit 68 of the fuel cell vehicle 20 of the present embodiment. FIG. 3 is a timing chart illustrating the overview of operations associated with abnormality detection control. The operations that are performed to detect an abnormality of the sensors that detect the pressure of fuel gas, specifically an abnormality of the filling pressure sensor 41 and the high pressure sensor 42, will be described with reference to FIGS. 2 and 3.

The abnormality detection control routine shown in FIG. 2 is started when the control unit 68 determines that filling of the fuel tank 60 of the fuel cell vehicle 20 with hydrogen is started. In the present embodiment, the control unit 68 determines that filling of the fuel tank 60 is started when the control unit 68 receives from the lid sensor 46 a signal indicating that the lid 24 is opened. In the case where the fuel cell vehicle 20 is provided with the above communication device for communicating with the hydrogen fueling device 70, the control unit 68 may determine that filling of the fuel tank 60 is started when the communication is started. The system of the fuel cell vehicle 20 is normally in a stopped state when filling the fuel tank 60 with hydrogen. That is, a start switch for starting the system, which is provided in the fuel cell vehicle 20, is off when filling the fuel tank 60 with hydrogen. The control unit 68 that executes the abnormality detection control routine with the start switch being off and with the fuel cell system 25 being stopped uses a power storage device, not shown, as its power source. This power storage device is mounted on the fuel cell vehicle 20 and is different from the fuel cell 66.

When the lid 24 of the fuel cell vehicle 20 is opened and the abnormality detection control routine of FIG. 2 is started, a user who performs a hydrogen fueling operation attaches the nozzle 72 of the hydrogen fueling device 70 to the receptacle 64. When the nozzle 72 is attached to the receptacle 64, the hydrogen fueling device 70 starts supplying hydrogen to the fuel tank 60.

When the control unit 68 detects the start of filling of the fuel tank 60 by a signal received from the lid sensor 46 (step S100), the control unit 68 obtains a detection signal of the filling pressure sensor 41 and thus starts detecting a filling gas pressure Pi that is the pressure of hydrogen being supplied to the fuel tank 60 (step S130). When the nozzle 72 is attached to the receptacle 64 and the hydrogen fueling device 70 starts supplying hydrogen, the tank pressure increases gradually. As described above, the pressure that is detected by the filling pressure sensor 41 during filling of the fuel tank 60 with fuel gas is approximately equal to the tank pressure. The filling gas pressure Pi is therefore considered to represent the tank pressure.

FIG. 3 illustrates how the filling gas pressure Pi and a supply gas pressure Po change and the timing at which abnormality detection control using the filling gas pressure Pi and the supply gas pressure Po is performed. The filling gas pressure Pi is the gas pressure that is detected by the filling pressure sensor 41 mounted on the filling pipe 30, and the supply gas pressure Po is the gas pressure that is detected by the high pressure sensor 42 mounted on the supply pipe 32. In FIG. 3, time t1 indicates the timing at which the control unit 68 starts detecting the filling gas pressure Pi in step S130 after detecting the start of filling in step S100. FIG. 3 shows that the filling gas pressure Pi, which is the tank pressure, gradually increases after filling is started at time t1. Since the main stop valve 53 of the valve mechanism 62 is closed during filling with hydrogen, the supply gas pressure Po does not change even after time t1. The control including the operations from step S130 to step S180 in FIG. 2 is also referred to as the "abnormality detection control." FIG. 3 further shows that the control unit 68 starts the abnormality detection control by starting detection of the filling gas pressure Pi in step S130 at time t1.

The control unit 68 of the present embodiment stores a maximum filling pressure Pimax stored therein. The maximum filling pressure Pimax is a maximum value of the filling gas pressures Pi detected since the start of detection of the filling gas pressure Pi in step S130. Hereinafter, the maximum filling pressure Pimax is sometimes simply referred to as the "maximum pressure Pimax." The CPU of the control unit 68 starts detecting the filling gas pressure Pi in step S130. When a newly detected filling gas pressure Pi is the maximum value of the filling gas pressures Pi detected since the start of detection of the filling gas pressure Pi, the CPU of the control unit 68 updates the stored maximum pressure Pimax with the newly detected filling gas pressure Pi (step S140). In step S140, when the newly detected filling gas pressure Pi is not the maximum value of the filling gas pressures Pi detected since the start of detection of the filling gas pressure Pi, the CPU of the control unit 68 maintains the stored maximum pressure Pimax without updating.

For example, in step S140, instead of updating the stored maximum pressure Pimax with the newly detected filling gas pressure Pi, the detected filling gas pressures Pi may be stored chronologically and the stored maximum pressure Pimax may be updated with the average value of a plurality of most recent detected filling gas pressures Pi. The stored maximum pressure Pimax may be updated with a value obtained by averaging variations in detected filling gas pressures Pi before and after the actually measured maximum value of the filling gas pressure Pi, such as the average described above.

After step S140, the CPU of the control unit 68 determines whether the operation of filling the fuel tank 60 with hydrogen (hereinafter sometimes referred to as the filling operation or filling) is finished (step S150). When the filling operation by the hydrogen fueling device 70 proceeds and is eventually substantially stopped, the user performing the hydrogen fueling operation removes the nozzle 72 of the hydrogen fueling device 70 from the receptacle 64 and closes the lid 24. In step S150, the CPU of the control unit 68 of the present embodiment determines that the filling operation is finished when the CPU of the control unit 68 receives from the lid sensor 46 a signal indicating that the lid 24 is closed.

When the CPU of the control unit 68 determines that the filling operation is not finished (step S150: NO), the routine returns to step S140 and the CPU of the control unit 68 repeatedly detects the filling gas pressure Pi and repeats the operation of updating the stored maximum pressure Pimax with a newly detected maximum pressure Pimax. The CPU of the control unit 68 repeats this updating operation of the maximum pressure Pimax as long as the tank pressure continues to increase during filling by the hydrogen fueling device 70. For example, the filling gas pressure Pi reaches its maximum value when the fuel tank 60 becomes completely full and thus the filling operation by the hydrogen fueling device 70 is substantially stopped. The maximum pressure Pimax is therefore fixed at this time. In FIG. 3, time t2 indicates the timing at which the filling operation by the hydrogen fueling device 70 is substantially stopped, namely the timing at which the hydrogen fueling device 70 stops supplying hydrogen to the fuel tank 60. As described above, after the filling operation by the hydrogen fueling device 70 is substantially stopped, the nozzle 72 of the hydrogen fueling device 70 is removed from the receptacle 64 and the lid 24 is closed. The CPU of the control unit 68 thus determines that the filling operation is finished. In FIG. 3, time t3 indicates the timing at which the lid 24 is closed and the CPU of the control unit 68 determines that the filling operation is finished. Since the receptacle 64 is provided with the first check valve 51, the filling gas pressure Pi, which is the gas pressure detected by the filling pressure sensor 41, is approximately equal to the maximum pressure Pimax even after time t2 when the filling operation by the hydrogen fueling device 70 is substantially stopped. To be exact, since the hydrogen gas temperature in the fuel tank 60 decreases gradually, the filling gas pressure Pi decreases slowly.

When the CPU of the control unit 68 determines that the filling operation is finished (step S150: YES), the CPU of the control unit 68 determines whether the fuel cell vehicle 20 is started (step S160). Specifically, the CPU of the control unit 68 determines whether the start switch provided in the fuel cell vehicle 20 is on. When the fuel cell vehicle 20 is not started (step S160: NO), the CPU of the control unit 68 repeats step S160 until it determines that the fuel cell vehicle 20 is started. When the start switch is turned on and the fuel cell system 25 is started, the main stop valve 53 of the valve mechanism 62 is opened to start supplying hydrogen from the fuel tank 60 to the fuel cell 66. In FIG. 3, time t4 indicates the timing at which the fuel cell system 25 is started. When the main stop valve 53 is opened at time t4, the supply gas pressure Po rapidly increases to the tank pressure. In the case where the period from time t3 to time t4 is relatively short, the tank pressure at the time when the fuel cell system 25 is started is approximately the same as the tank pressure at the time when the filling operation is finished. Accordingly, in this case, the supply gas pressure Po at time t4 is approximately the same as the maximum pressure Pimax stored at the time when the filling operation is finished.

When the CPU of the control unit 68 determines that the fuel cell vehicle 20 is started (step S160: YES), the CPU of the control unit 68 obtains a detection signal of the high pressure sensor 42 and thus detects the supply gas pressure Po, namely the pressure of hydrogen that is supplied from the fuel tank 60 to the fuel cell 66 (step S170). The supply gas pressure Po that is detected in step S170 is the value of the supply gas pressure Po that is detected by the high pressure sensor 42 when supply of hydrogen from the fuel tank 60 to the fuel cell 66 is started for the first time after the filling operation is finished, and is also referred to as the "supply start pressure." The CPU of the control unit 68 then determines whether there is an abnormality in the pressure sensors by comparing the maximum pressure Pimax stored in step S140 with the supply gas pressure Po detected in step S170 (step S180). The CPU of the control unit 68 thus finishes this routine. FIG. 3 shows that the abnormality detection control is finished at time t4.

In step S180, the CPU of the control unit 68 determines that both the filling pressure sensor 41 and the high pressure sensor 42 are normal when the difference between the maximum pressure Pimax and the supply gas pressure Po is equal to or smaller than a predetermined reference value. When the difference between the maximum pressure Pimax and the supply gas pressure Po is larger than the reference value, the CPU of the control unit 68 determines that there is a possibility that at least one of the filling pressure sensor 41 and the high pressure sensor 42 may be abnormal. The reference value is set in advance in view of the detection accuracy of the filling pressure sensor 41 and the high pressure sensor 42. The reference value is set in advance to the maximum value of those possible differences between the detection value of the filling pressure sensor 41 and the detection value of the high pressure sensor 42 that can be obtained when the tank pressure of the completely full fuel tank 60 is individually measured by the filling pressure sensor 41 and the high pressure sensor 42 when both the filling pressure sensor 41 and the high pressure sensor 42 are normal. When the CPU of the control unit 68 determines in step S180 that the difference between the maximum pressure Pimax and the supply gas pressure Po is larger than the reference value, there is a possibility that the high pressure sensor 42 mounted on the supply pipe 32 may be abnormal. In this case, the CPU of the control unit 68 may prohibit the fuel cell vehicle 20 from moving.

According to the fuel cell system 25 of the present embodiment configured as described above, the possibility that the pressure sensors may be erroneously determined to be abnormal is reduced even in the case where the pressure in the filling flow path decreases after filling the fuel tank 60 with hydrogen due to airtightness of the first check valve 51 being impaired by foreign matter caught in the receptacle 64, for example. In the case where there is no such problem with the receptacle 64 etc., the filling gas pressure Pi is approximately the same during the period from time t2 when the filling operation is substantially stopped until time t3 when the CPU of the control unit 68 determines that the filling operation is finished. Accordingly, for example, the CPU of the control unit 68 can determine whether there is an abnormality in the pressure sensors in a manner similar to that of the embodiment even by comparing the filling gas pressure Pi obtained from the filling pressure sensor 41 at time t3 and the supply gas pressure Po obtained from the high pressure sensor 42 at time t4 that is when the fuel cell system 25 is started the next time. However, in the case where there is such a problem with the receptacle 64 etc., the filling gas pressure Pi, which is the pressure in the filling pipe 30, decreases during the period from time t2 when the filling operation is substantially stopped to time t3. In FIG. 3, how the filling gas pressure Pi gradually decreases after time t2 is shown by a dashed line.

In this case, the filling gas pressure Pi that is detected at time t3 when the CPU of the control unit 68 determines that the filling operation is finished is lower than the tank pressure that is detected at time t2 when the filling operation is substantially stopped. Accordingly, when the CPU of the control unit 68 determines whether there is an abnormality in the pressure sensors by comparing the filling gas pressure Pi detected at time t3 and the supply gas pressure Po detected at time t4, the difference between the filling gas pressure Pi and the supply gas pressure Po is large and therefore the CPU of the control unit 68 may determine that there is an abnormality in the filling pressure sensor 41 and the high pressure sensor 42 are abnormal even when both sensors are normal. The detection value of the filling pressure sensor 41 that is used in the present embodiment is not the value of the filling gas pressure Pi detected when the CPU of the control unit 68 determines that the filling operation is finished but the maximum pressure Pimax that is the maximum value of the filling gas pressures Pi detected during filling. The maximum pressure Pimax as above is considered to be substantially the same as the pressure in the fuel tank 60 at the time when the filling operation is substantially stopped. Accordingly, the possibility that the pressure sensors may be erroneously determined to be abnormal is reduced even in the case where the pressure in the filling flow path decreases after filling the fuel tank 60 with hydrogen. The filling gas pressure Pi decreases during the period from time t2 to time t3 not only in the case where airtightness is impaired in the receptacle 64 as described above but also in the case where airtightness is impaired at any location in the filling flow path after filling the fuel tank 60 with hydrogen.

B. Second Embodiment

In the first embodiment, the abnormality detection control including the operations from step S130 to step S180 of FIG. 2 is started at time t1 when filling is started. However, the present disclosure may have different configurations. Examples in which the timing at which the abnormality detection control is started is different from the first embodiment will be described below in second to fourth embodiments. Since the fuel cell systems 25 of the second to fifth embodiments described below have a configuration similar to that of the first embodiment, the same portions as those of the first embodiment are denoted by the same signs as those of the first embodiment, and detailed description thereof will be omitted.

Figure 4:
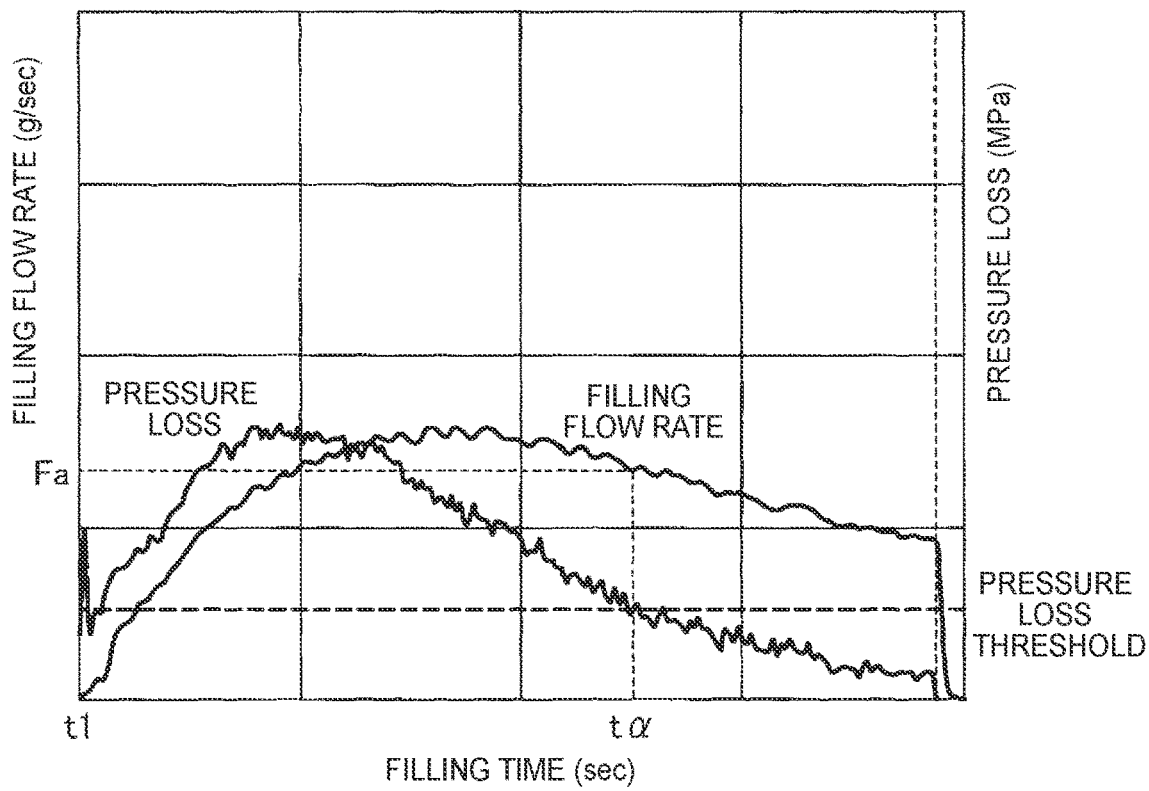
FIG. 4 is a graph illustrating the relationship between the filling time and the pressure loss and the filling flow rate.

FIG. 4 is a graph illustrating the relationship between the filling time for filling the fuel tank 60 with hydrogen and the pressure loss and the filling flow rate. The filling time on the abscissa is the time elapsed from time t1 of FIG. 3 when filling is started. The pressure loss is the pressure loss that occurs when fuel gas flows through the filling pipe 30, and refers to the pressure loss that occurs between the part of the filling pipe 30 where the filling pressure sensor 41 is mounted and the fuel tank 60. The filling flow rate is the flow rate of fuel gas flowing through the filling flow path. As shown in FIG. 4, when filling the fuel tank 60 with hydrogen, the pressure loss and the filling flow rate in the filling pipe 30 exhibit a tendency to increase for a while after the start of filling but exhibit a tendency to decrease thereafter.

When the hydrogen fueling device 70 fills the fuel tank 60 with hydrogen, the hydrogen fueling device 70 maintains a constant pressure increase rate, but an increase in tank pressure gradually slows down. Accordingly, the flow velocity and the filling flow rate of hydrogen flowing in the filling flow path increase for a while after the start of filling but decreases thereafter. The pressure loss is considered to be affected by a loss in a straight pipe including a friction force that is generated between gas and the wall surface of the flow path, a contraction loss, and a bend loss, etc. In the present embodiment, the pressure loss is considered to be greatly affected by the pipe resistance composed of the losses above, and especially affected by the flow velocity of hydrogen that is a compressible fluid. Accordingly, as shown in FIG. 4, the pressure loss and the filling flow rate show a certain pattern that is determined by filling conditions such as the temperature of fuel gas that is supplied from the hydrogen fueling device 70, the pipe shape of the filling flow path, and the state of pressure control during filling.

A pressure loss threshold, which is a reference value that is used to determine that the pressure loss during filling is sufficiently decreased, can be determined as shown in FIG. 4. This pressure loss threshold is a value indicating that, even in the case where the detection value of the filling pressure sensor 41 becomes higher than a true tank pressure due to the pressure loss, the pressure loss is decreased to such an extent that the detection value of the filling pressure sensor 41 does not become larger than the tank pressure at the end of filling. This pressure loss threshold may change depending on the accuracy of the filling pressure sensor 41 and the high pressure sensor 42 to be used, structural factors that affect the above friction force such as the shape of the filling pipe, conditions during filling, etc., and can be determined in advance according to the configuration of the fuel cell system 25. The pressure loss threshold is also referred to as the "determination value."

The system configuration of the fuel cell system 25 of the present embodiment is simplified by using the detection value of the filling pressure sensor 41 mounted on the filling pipe 30 as the tank pressure, instead of directly attaching a pressure sensor to the fuel tank 60. It is therefore difficult to detect the pressure loss during filling. In the second embodiment, the filling flow rate (mass flow rate) detected by the flow rate sensor 47 is used to determine whether the pressure loss during filling is estimated to be decreased sufficiently, namely whether the pressure loss during filling is decreased to the pressure loss threshold.

As described above, the pressure loss and the filling flow rate show such a certain pattern as shown in FIG. 4 according to the state of the pressure control during filling etc. Such a relationship between the pressure loss and the filling flow rate can be obtained in advance experimentally or by simulations. In the second embodiment, a reference flow rate Fa is determined in advance using the relationship between the pressure loss and the filling flow rate described above. The reference flow rate Fa is a reference value of the filling flow rate that is used to determine whether the pressure loss during filling is decreased to the pressure loss threshold. FIG. 4 shows that the filling flow rate at filling time to when the pressure loss decreases to the pressure loss threshold is determined as the reference flow rate Fa. The reference flow rate Fa is determined by the value of the pressure loss threshold that is set and the relationship between the pressure loss and the filling flow rate. The reference flow rate Fa can be set to, for example, 30 g/sec.

Figure 5:
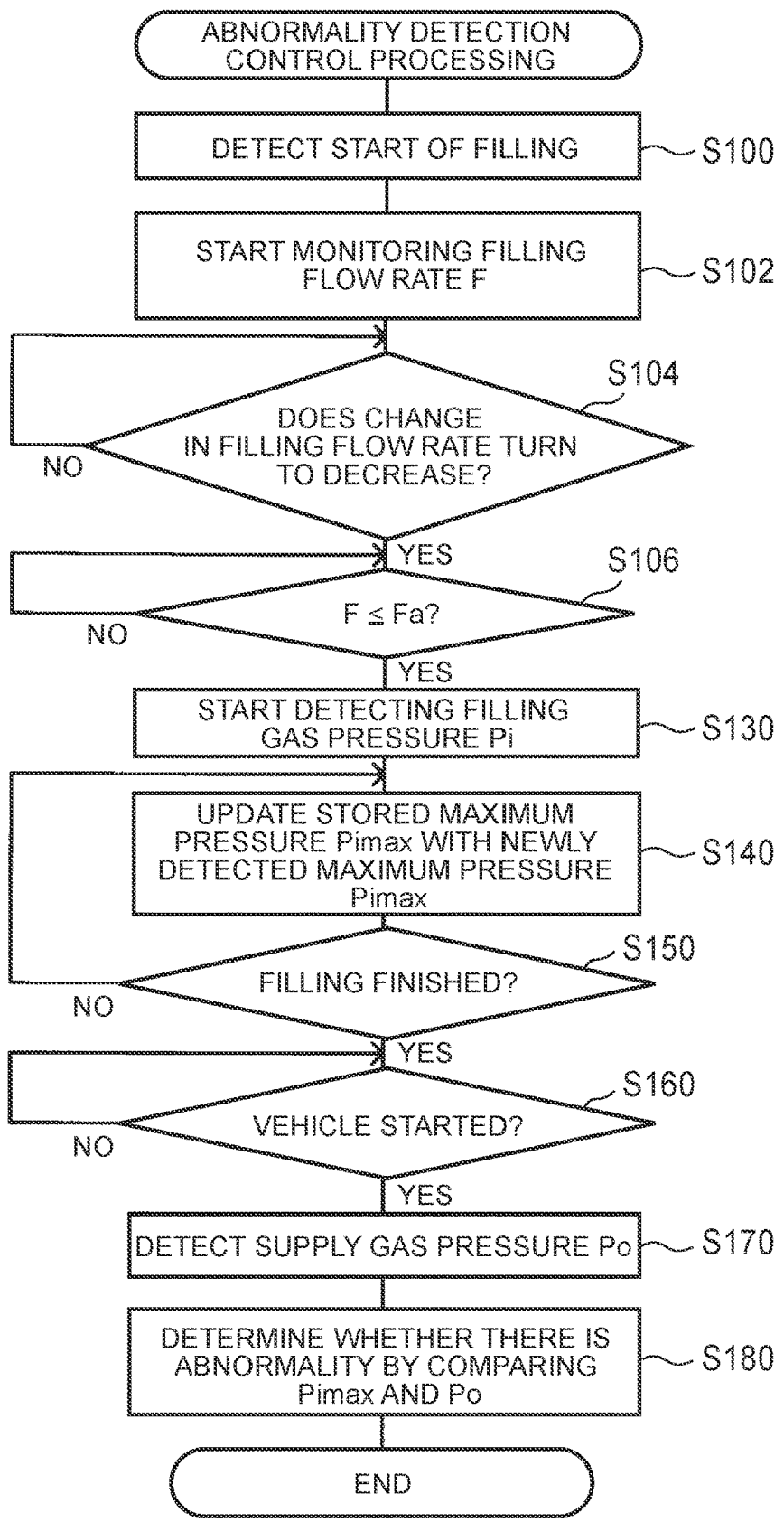
FIG. 5 is a flowchart of an abnormality detection control routine.
Figure 6:
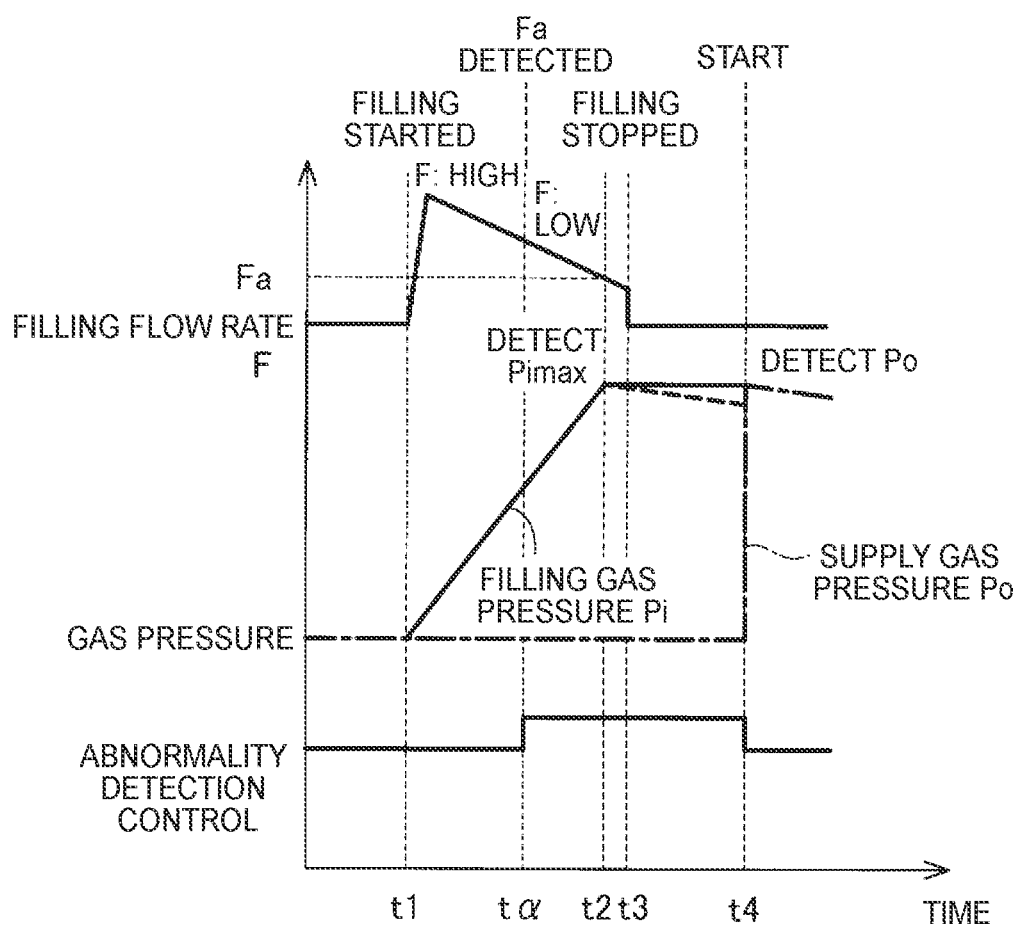
FIG. 6 is a timing chart illustrating the overview of operations associated with abnormality detection control.

FIG. 5 is a flowchart of an abnormality detection control routine that is executed by the CPU of the control unit 68 of the fuel cell vehicle 20 of the second embodiment. FIG. 6 is a timing chart illustrating the overview of operations associated with abnormality detection control. The operations that are performed to detect an abnormality of the filling pressure sensor 41 and the high pressure sensor 42 will be described with reference to FIGS. 5 and 6. In FIG. 5, the same steps as those of FIG. 2 are denoted with the same step numbers.

The control unit 68 executes the abnormality detection control routine of FIG. 5 instead of the abnormality detection control routine of the first embodiment shown in FIG. 2. When the CPU of the control unit 68 of the second embodiment detects the start of filling of the fuel tank 60 with hydrogen (step S100), the CPU of the control unit 68 obtains a detection signal from the flow rate sensor 47 and thus starts monitoring a filling flow rate F (step S102). The filling flow rate F is the flow rate of hydrogen that is supplied to the fuel tank 60.

Similar to FIG. 3, FIG. 6 illustrates how the filling gas pressure Pi and the supply gas pressure Po change and the timing at which abnormality detection control using the filling gas pressure Pi and the supply gas pressure Po is performed. FIG. 6 also illustrates how the filling flow rate F changes. In FIG. 6, the pattern in which the filling flow rate F changes is shown simplified as compared to FIG. 4. In the second embodiment, unlike in the first embodiment, the abnormality detection control involving detection of the filling gas pressure Pi is not started at time t1 when the start of filling is detected in step S100, as shown in FIG. 6.

After the CPU of the control unit 68 starts monitoring the filling flow rate F in step S102, the CPU of the control unit 68 determines whether a change in filling flow rate F with time turns from increase to decrease (step S104). That is, after step S102, the CPU of the control unit 68 repeatedly performs the operation of obtaining the detection value of the flow rate sensor 47 and determines whether the amount of change in filling flow rate F, which is the difference between the current and previous detection values of the flow rate sensor 47, turns from a state where the difference continues to take a positive value to a state where the difference continue to take a negative value. The CPU of the control unit 68 repeats the operation of step S104 as long as the CPU of the control unit 68 determines that the change in filling flow rate F with time does not turn from increase to decrease (step S104: NO).

When the CPU of the control unit 68 determines that the change in filling flow rate F with time turns from increase to decrease (step S104: YES), the CPU of the control unit 68 compares the filling flow rate F with the reference flow rate Fa described above (step S106). That is, after step S104, the CPU of the control unit 68 repeats the operation of obtaining the detection value of the flow rate sensor 47 and comparing the obtained filling flow rate F with the reference flow rate Fa. The CPU of the control unit 68 repeats the operation of step S106 as long as the CPU of the control unit 68 determines that the obtained filling flow rate F is higher than the reference flow rate Fa (step S106: NO).

When the CPU of the control unit 68 determines that the obtained filling flow rate F is equal to or lower than the reference flow rate Fa (step S106: YES), the CPU of the control unit 68 executes the abnormality detection control including the operations of steps S130 to S180 that is similar to the abnormality detection control of the first embodiment. The CPU of the control unit 68 then ends this routine. That is, the CPU of the control unit 68 starts detecting the filling gas pressure Pi and obtains the maximum pressure Pimax, and determines whether there is an abnormality in the pressure sensors by comparing the maximum pressure Pimax with the supply gas pressure Po. In FIG. 6, time ta indicates the timing at which the CPU of the control unit 68 determines that the obtained filling flow rate F is equal to or lower than the reference flow rate Fa. FIG. 6 further shows that the abnormality detection control is started at time ta.

This configuration improves accuracy of abnormality determination for the pressure sensors in addition to the effects similar to those of the first embodiment. That is, the value of the filling gas pressure Pi detected when the pressure loss in the filling flow path is high is less likely to be stored as the maximum pressure Pimax that is higher than the tank pressure at the end of filling. Accordingly, the possibility is reduced that the pressure sensors may be erroneously determined to be abnormal even though the pressure sensors are normal due to the maximum pressure Pimax being higher than the supply gas pressure Po.

During filling, as the pressure loss in the filling flow path becomes larger, the pressure that is detected as the tank pressure by the filling pressure sensor 41 becomes higher than the actual pressure in the fuel tank 60. In this case, when whether there is an abnormality in the pressure sensors is determined using the maximum pressure Pimax derived from the detection values of the filling pressure sensor 41, there is a possibility that the value detected by the filling pressure sensor 41 when the pressure loss is large during filling may be derived as the maximum pressure Pimax instead of a true maximum pressure at the end of filling of the fuel tank 60. When whether there is an abnormality in the pressure sensors is determined using, as the maximum pressure Pimax, the pressure that is higher than the true maximum pressure at the end of filling (step S180 in FIG. 2), the pressure sensors may be erroneously determined to be abnormal even when the pressure sensors are normal, because the maximum pressure Pimax is higher than the supply gas pressure Po detected in step S170. In the fuel cell system 25 of the second embodiment, detection of the filling gas pressure Pi, which is performed to obtain the maximum pressure Pimax, is started after the pressure loss during filling is estimated to be decreased sufficiently. Accordingly, the possibility of such erroneous abnormality determination is reduced even when the pressure loss increases during filling.

C. Third Embodiment

In the third embodiment, as in the second embodiment, abnormality detection control for the pressure sensors, which involves updating the maximum pressure Pimax, is performed after the pressure loss during filling is estimated to be decreased sufficiently. In the third embodiment, the rate of increase in the filling gas pressure Pi detected by the filling pressure sensor 41 (hereinafter also referred to as the pressure increase rate $\Delta Pi$) is used to determine whether the pressure loss during filling is decreased to the pressure loss threshold. In the present embodiment, the pressure increase rate $\Delta Pi$ is an increase in filling gas pressure Pi per unit time. However, the pressure increase rate $\Delta Pi$ may be, for example, the ratio of the present detection value to the previous detection value of the filling gas pressure Pi that is detected at regular time intervals.

Figure 7:
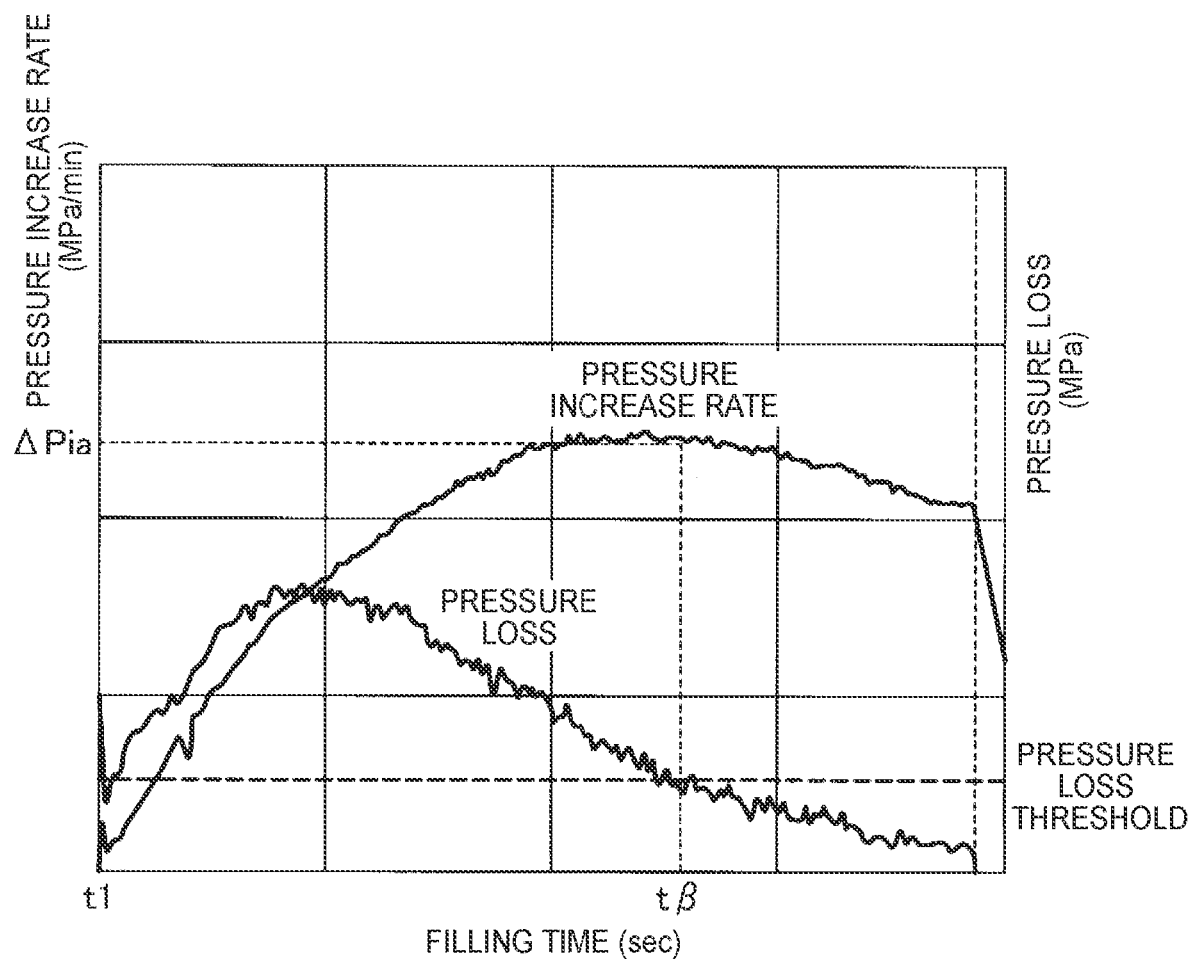
FIG. 7 is a graph illustrating the relationship between the filling time and the pressure loss and the pressure increase rate.

FIG. 7 is a graph illustrating the relationship between the filling time for filling the fuel tank 60 with hydrogen and the pressure loss and the pressure increase rate. The filling time and the pressure loss are similar to those of FIG. 4 of the second embodiment. The pressure increase rate is the rate of increase in pressure of fuel gas flowing through the filling flow path as described above. As shown in FIG. 7, when filling the fuel tank 60 with hydrogen, the pressure loss and the pressure increase rate exhibit a tendency to increase for a while after the start of filling but exhibit a tendency to decrease thereafter. As described above, this is because, when the hydrogen fueling device 70 fills the fuel tank 60 with hydrogen, the hydrogen fueling device 70 maintains a constant pressure increase rate but an increase in pressure in the fuel tank 60 gradually slows down. Accordingly, as shown in FIG. 7, the pressure loss and the pressure increase rate show a certain pattern that is determined by filling conditions such as the temperature of fuel gas that is supplied from the hydrogen fueling device 70, the pipe shape of the filling flow path, and the state of pressure control during filling.

Such a relationship between the pressure loss and the pressure increase rate can be obtained in advance experimentally or by simulations. In the third embodiment, a reference rate $\Delta Pia$ is determined in advance using this relationship between the pressure loss and the pressure increase rate. The reference rate $\Delta Pia$ is a reference value of the pressure increase rate that is used to determine whether the pressure loss during filling is decreased to the pressure loss threshold. FIG. 7 shows that the pressure increase rate at filling time t$\beta$ when the pressure loss decreases to the pressure loss threshold is determined as the reference rate $\Delta Pia$. The reference rate $\Delta Pia$ is determined by the value of the pressure loss threshold that is set and the relationship between the pressure loss and the pressure increase rate. Such a reference rate $\Delta Pia$ can be set to, for example, 23 MPa/min. The reference rate $\Delta Pia$ is also referred to as the "first reference rate."

Figure 8:
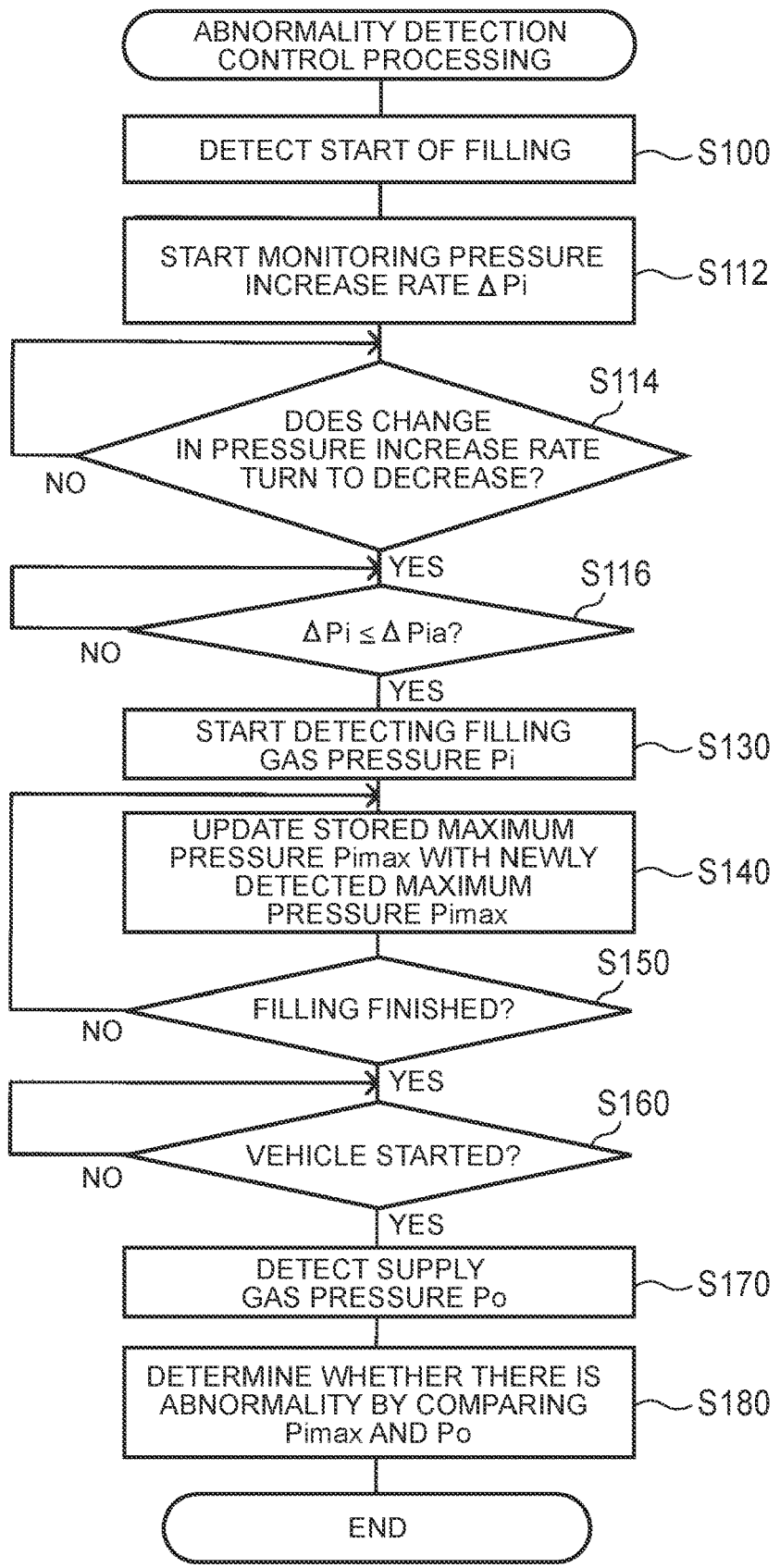
FIG. 8 is a flowchart of an abnormality detection control routine.
Figure 9:
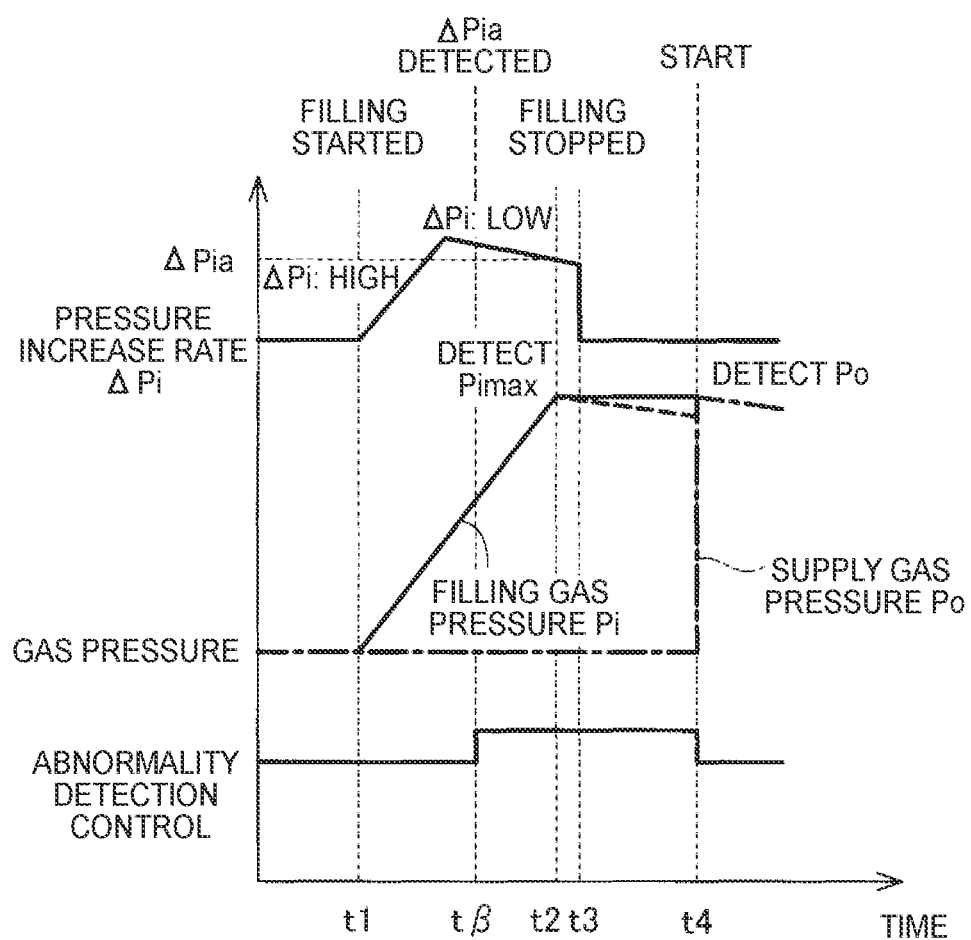
FIG. 9 is a timing chart illustrating the overview of operations associated with abnormality detection control.

FIG. 8 is a flowchart of an abnormality detection control routine that is executed by the CPU of the control unit 68 of the fuel cell vehicle 20 of the third embodiment. FIG. 9 is a timing chart illustrating the overview of operations associated with abnormality detection control. The operations that are performed to detect an abnormality of the filling pressure sensor 41 and the high pressure sensor 42 will be described with reference to FIGS. 8 and 9. In FIG. 8, the same steps as those of FIG. 2 are denoted with the same step numbers.

The control unit 68 executes the abnormality detection control routine of FIG. 8 instead of the abnormality detection control routine of the first embodiment shown in FIG. 2. When the CPU of the control unit 68 of the third embodiment detects the start of filling of the fuel tank 60 with hydrogen (step S100), the CPU of the control unit 68 obtains a detection signal from the filling pressure sensor 41 and thus starts monitoring the pressure increase rate $\Delta Pi$ (step S112). The pressure increase rate $\Delta Pi$ is the rate of increase in pressure in the filling flow path.

Similar to FIG. 3, FIG. 9 illustrates how the filling gas pressure Pi and the supply gas pressure Po change and the timing at which abnormality detection control using the filling gas pressure Pi and the supply gas pressure Po is performed. FIG. 9 also illustrates how the pressure increase rate $\Delta Pi$ changes. In FIG. 9, the pattern in which the pressure increase rate $\Delta Pi$ changes is shown simplified as compared to FIG. 7. In the third embodiment, unlike in the first embodiment, the abnormality detection control is not started at time t1 when the start of filling is detected in step S100, as shown in FIG. 9.

After the CPU of the control unit 68 starts monitoring the pressure increase rate $\Delta Pi$ in step S112, the CPU of the control unit 68 determines whether a change in pressure increase rate $\Delta Pi$ with time turns from increase to decrease (step S114). That is, after step S112, the CPU of the control unit 68 repeatedly performs the operation of obtaining the detection value of the filling pressure sensor 41 and calculates the pressure increase rate $\Delta Pi$, and determines whether the amount of change in pressure increase rate $\Delta Pi$, which is the difference between the current and previous pressure increase rates ΔPi, turns from a state where the difference continues to take a positive value to a state where the difference continue to take a negative value. The CPU of the control unit 68 repeats the operation of step S114 as long as the CPU of the control unit 68 determines that the change in pressure increase rate ΔPi with time does not turn from increase to decrease (step S114: NO).

When the CPU of the control unit 68 determines that the change in pressure increase rate ΔPi with time turns from increase to decrease (step S114: YES), the CPU of the control unit 68 compares the calculated pressure increase rate ΔPi with the reference rate ΔPia described above (step S116). That is, after step S114, the CPU of the control unit 68 repeats the operation of obtaining the detection value of the filling pressure sensor 41, calculating the pressure increase rate ΔPi, and comparing the calculated pressure increase rate ΔPi with the reference rate ΔPia. The CPU of the control unit 68 repeats the operation of step S116 as long as the CPU of the control unit 68 determines that the calculated pressure increase rate ΔPi is higher than the reference rate ΔPia (step S116: NO).

When the CPU of the control unit 68 determines that the calculated pressure increase rate ΔPi is equal to or lower than the reference rate ΔPia (step S116: YES), the CPU of the control unit 68 executes the abnormality detection control including the operations of steps S130 to S180 that is similar to the abnormality detection control of the first embodiment. The CPU of the control unit 68 then ends this routine. That is, the CPU of the control unit 68 starts detecting the filling gas pressure Pi and updates the maximum pressure Pimax, and determines whether there is an abnormality in the pressure sensors by comparing the maximum pressure Pimax with the supply gas pressure Po. In FIG. 9, time tβ indicates the timing at which the CPU of the control unit 68 determines that the calculated pressure increase rate ΔPi is equal to or lower than the reference rate ΔPia. FIG. 9 further shows that the abnormality detection control is started at time tβ.

This configuration further improves accuracy of abnormality determination for the pressure sensors in addition the effects similar to those of the first embodiment. That is, the value of the filling gas pressure Pi detected when the pressure loss in the filling flow path is high is less likely to be stored as the maximum pressure Pimax that is higher than the tank pressure at the end of filling. Accordingly, the possibility is reduced that the pressure sensors may be erroneously determined to be abnormal even though the pressure sensors are normal due to the maximum pressure Pimax being higher than the supply gas pressure Po.

In the third embodiment described above, the detection value of the filling pressure sensor 41 is used when monitoring the pressure increase rate ΔPi in steps S112 to S116. However, the present disclosure may have a different configuration. For example, when the fuel cell vehicle 20 can obtain the detection value of the station pressure sensor 75 of the hydrogen fueling device 70 via communication between the fuel cell vehicle 20 and the hydrogen fueling device 70, the fuel cell vehicle 20 may monitor the pressure increase rate ΔPi using the detection value of the station pressure sensor 75.

D. Fourth Embodiment

In the fourth embodiment, as in the second embodiment, abnormality detection control for the pressure sensors, which involves updating the maximum pressure Pimax, is performed after the pressure loss during filling is estimated to be decreased sufficiently. In the fourth embodiment, the rate of increase in temperature Tx in the fuel tank 60 detected by the temperature sensor 45 is used to determine whether the pressure loss during filling is decreased to the pressure loss threshold. The rate of increase in temperature Tx in the fuel tank 60 is also referred to as the "tank temperature increase rate" or the "temperature increase rate ΔTx." In the present embodiment, the temperature increase rate ΔTx is an increase in tank temperature Tx per unit time. However, the temperature increase rate ΔTx may be, for example, the ratio of the present detection value to the previous detection value of the tank temperature Tx that is detected at regular time intervals.

Figure 10:
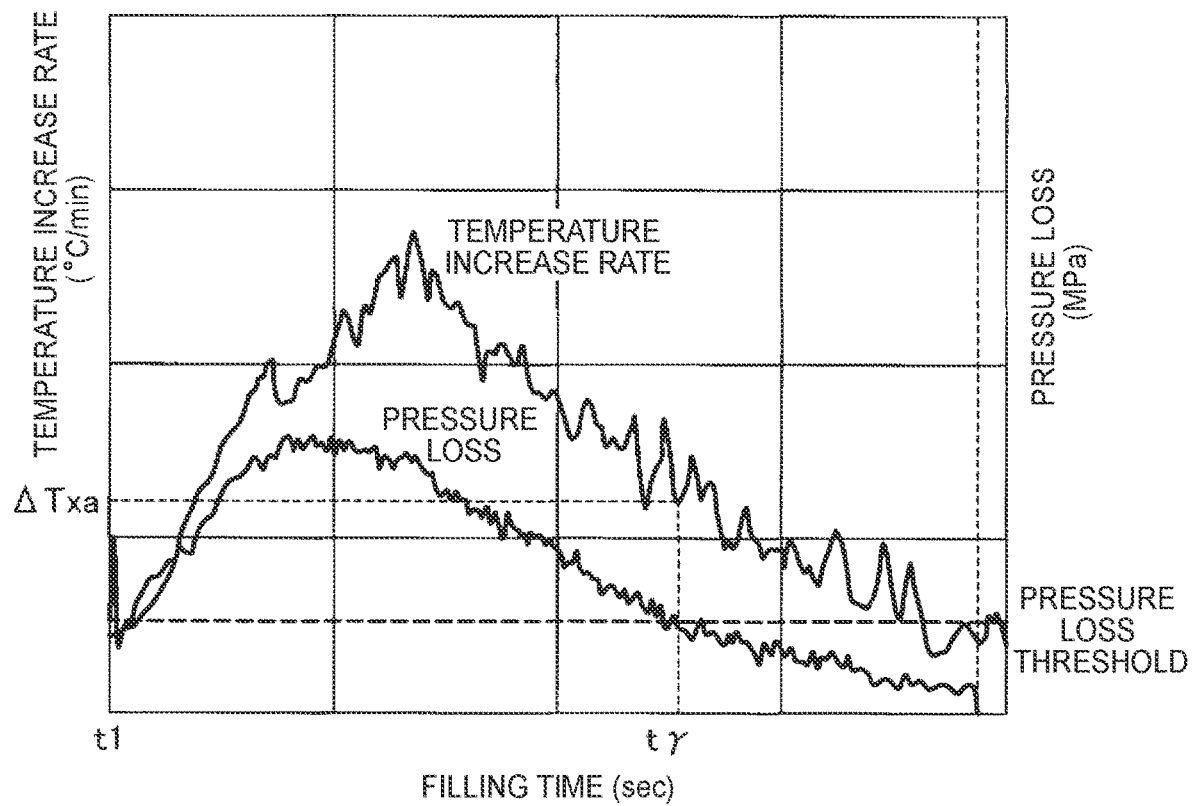
FIG. 10 is a graph illustrating the relationship between the filling time and the pressure loss and the temperature increase rate.

FIG. 10 is a graph illustrating the relationship between the filling time for filling the fuel tank 60 with hydrogen and the pressure loss and the temperature increase rate. The filling time and the pressure loss are similar to those of FIG. 4 of the second embodiment. The temperature increase rate is the rate of increase in temperature in the fuel tank 60 as described above. As shown in FIG. 10, when filling the fuel tank 60 with hydrogen, the pressure loss and the temperature increase rate exhibit a tendency to increase for a while after the start of filling but exhibit a tendency to decrease thereafter. As described above, when filling the fuel tank 60 with hydrogen, the temperature in the fuel tank 60 increases due to a phenomenon like adiabatic compression. The rate of increase in temperature in the fuel tank 60 increases as the flow rate of fuel gas that is supplied to the fuel tank 60 through the filling flow path, namely the filling flow rate, increases. As described above, the filling flow rate increases for a while after the start of filling and decreases thereafter. Accordingly, the temperature increase rate of the fuel tank 60 increases for a while after the start of filling and decreases thereafter. As shown in FIG. 10, the pressure loss and the temperature increase rate show a certain pattern that is determined by filling conditions such as the temperature of fuel gas that is supplied from the hydrogen fueling device 70, the pipe shape of the filling flow path, and the state of pressure control during filling.

The relationship between the pressure loss and the temperature increase rate as described above can be obtained in advance experimentally or by simulations. In the fourth embodiment, a reference rate ΔTxa is determined in advance using this relationship between the pressure loss and the temperature increase rate. The reference rate ΔTxa is a reference value of the temperature increase rate that is used to determine whether the pressure loss during filling is decreased to the pressure loss threshold. FIG. 10 shows that the temperature increase rate at filling time tγ when the pressure loss decreases to the pressure loss threshold is determined as the reference rate ΔTxa. The reference rate ΔTxa is determined by the value of the pressure loss threshold that is set and the relationship between the pressure loss and the temperature increase rate. Such a reference rate ΔTxa above can be set to, for example, 20° C./min. The reference rate ΔTxa is also referred to as the "second reference rate."

Figure 11:
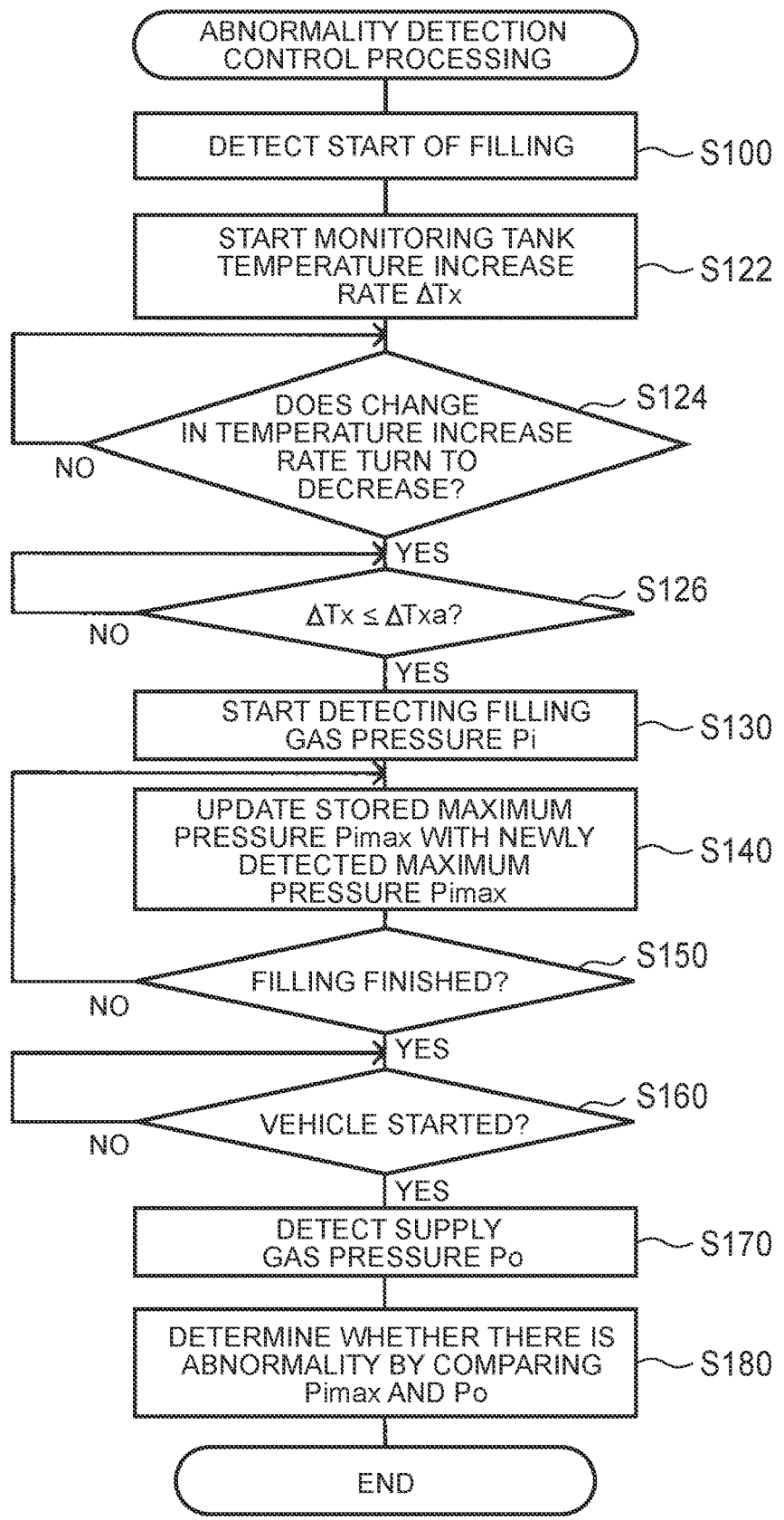
FIG. 11 is a flowchart of an abnormality detection control routine.
Figure 12:
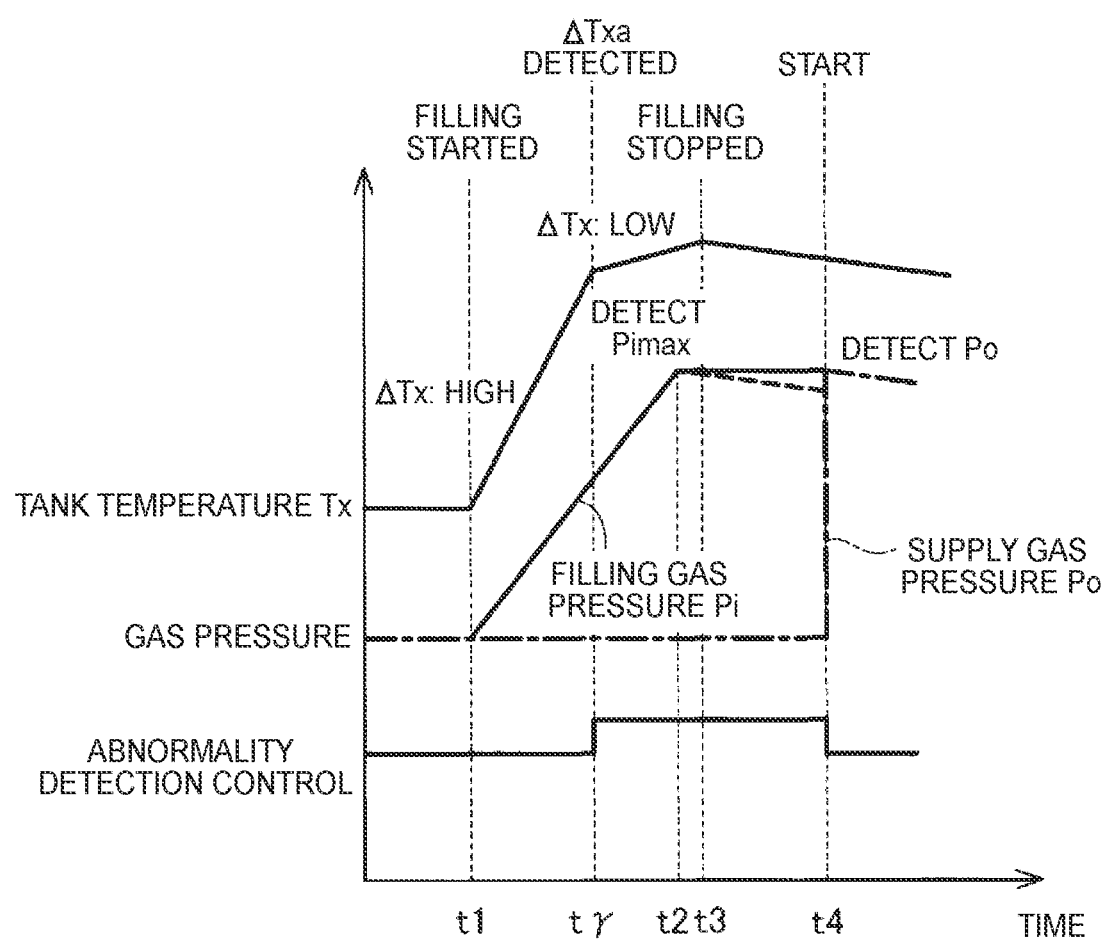
FIG. 12 is a timing chart illustrating the overview of operations associated with abnormality detection control.

FIG. 11 is a flowchart of an abnormality detection control routine that is executed by the CPU of the control unit 68 of the fuel cell vehicle 20 of the fourth embodiment. FIG. 12 is a timing chart illustrating the overview of operations associated with abnormality detection control. The operations that are performed to detect an abnormality of the filling pressure sensor 41 and the high pressure sensor 42 will be described with reference to FIGS. 11 and 12. In FIG. 11, the same steps as those of FIG. 2 are denoted with the same step numbers.

The control unit 68 executes the abnormality detection control routine of FIG. 11 instead of the abnormality detection control routine of the first embodiment shown in FIG. 2. When the CPU of the control unit 68 of the fourth embodiment detects the start of filling of the fuel tank 60 with hydrogen (step S100), the CPU of the control unit 68 obtains a detection signal from the temperature sensor 45, namely the temperature detected by the temperature sensor 45, and thus starts monitoring the temperature increase rate ΔTx (step S122). The temperature increase rate ΔTx is the rate of increase in temperature in the fuel tank 60.

Similar to FIG. 3, FIG. 12 illustrates how the filling gas pressure Pi and the supply gas pressure Po change and the timing at which abnormality detection control using the filling gas pressure Pi and the supply gas pressure Po is performed. FIG. 12 also illustrates how the temperature increase rate ΔTx changes. In FIG. 12, the pattern in which the temperature increase rate ΔTx changes is shown simplified as compared to FIG. 10. In the fourth embodiment, unlike in the first embodiment, the abnormality detection control is not started at time t1 when the start of filling is detected in step S100, as shown in FIG. 12.

After the CPU of the control unit 68 starts monitoring the temperature increase rate ΔTx in step S122, the CPU of the control unit 68 determines whether a change in temperature increase rate ΔTx with time turns from increase to decrease (step S124). That is, after step S122, the CPU of the control unit 68 repeatedly performs the operation of obtaining the detection value of the temperature sensor 45 and calculates the temperature increase rate ΔTx, and determines whether the amount of change in temperature increase rate ΔTx, which is the difference between the current and previous temperature increase rates ΔTx, turns from a state where the difference continues to take a positive value to a state where the difference continue to take a negative value. The CPU of the control unit 68 repeats the operation of step S124 as long as the CPU of the control unit 68 determines that the change in temperature increase rate ΔTx with time does not turn from increase to decrease (step S124: NO).

When the CPU of the control unit 68 determines that the change in temperature increase rate ΔTx with time turns from increase to decrease (step S124: YES), the CPU of the control unit 68 compares the calculated temperature increase rate ΔTx with the reference rate ΔTxa described above (step S126). That is, after step S124, the CPU of the control unit 68 repeats the operation of obtaining the detection value of the temperature sensor 45, calculating the temperature increase rate ΔTx, and comparing the calculated temperature increase rate ΔTx with the reference rate ΔTxa. The CPU of the control unit 68 repeats the operation of step S126 as long as the CPU of the control unit 68 determines that the calculated temperature increase rate ΔTx is higher than the reference rate ΔTxa (step S126: NO).

When the CPU of the control unit 68 determines that the calculated temperature increase rate ΔTx is equal to or lower than the reference rate ΔTxa (step S126: YES), the CPU of the control unit 68 executes the abnormality detection control including the operations of steps S130 to S180 that is similar to the abnormality detection control of the first embodiment. The CPU of the control unit 68 then ends this routine. That is, the CPU of the control unit 68 starts detecting the filling gas pressure Pi and updates the maximum pressure Pimax, and determines whether there is an abnormality in the pressure sensors by comparing the maximum pressure Pimax with the supply gas pressure Po. In FIG. 12, time tγ indicates the timing at which the CPU of the control unit 68 determines that the calculated temperature increase rate ΔTx is equal to or lower than the reference rate ΔTxa. FIG. 12 further shows that the abnormality detection control is started at time tγ.

This configuration also further improves accuracy of abnormality determination for the pressure sensors in addition to the effects similar to those of the first embodiment. That is, the value of the filling gas pressure Pi detected when the pressure loss in the filling flow path is high is less likely to be stored as the maximum pressure Pimax that is higher than the tank pressure at the end of filling. Accordingly, the possibility is reduced that the pressure sensors may be erroneously determined to be abnormal even though the pressure sensors are normal due to the maximum pressure Pimax being higher than the supply gas pressure Po.

E. Fifth Embodiment

In the first to fourth embodiments, whether there is an abnormality in the pressure sensors is determined using the difference between the supply gas pressure Po that is the supply start pressure and the maximum filling pressure Pimax. However, the present disclosure may have a different configuration. In the fifth embodiment, whether there is an abnormality in the pressure sensors is determined using the difference between the amount of fuel gas in the fuel tank 60 at the start of fuel gas supply to the fuel cell 66 and the amount of fuel gas in the fuel tank 60 at the time when the filling gas pressure Pi is the maximum value, namely the difference between the amount of fuel gas in the fuel tank 60 at the time when supply of hydrogen to the fuel cell 66 is started for the first time after filling is finished and the amount of fuel gas in the fuel tank 60 at the time when the detection value of the filling gas pressure Pi becomes maximum. The operation of determining whether there is an abnormality in the pressure sensors using the difference between the amounts of fuel gas is applicable to any of the first to fourth embodiments.

In the fifth embodiment, when updating the maximum pressure Pimax in step S140 of the above embodiments, the CPU of the control unit 68 also stores the temperature in the fuel tank 60, namely, the value detected by the temperature sensor 45, at the time when the maximum pressure Pimax for updating the stored maximum pressure Pimax is detected. When detecting the supply gas pressure Po, which is the supply start pressure, in step S170, the CPU of the control unit 68 also detects the temperature in the fuel tank 60, namely, the value detected by the temperature sensor 45, at the time when this supply gas pressure Po is detected.

In step S180, the CPU of the control unit 68 calculates the amount of fuel gas in the fuel tank 60 at the time when the filling gas pressure Pi is maximum, using the temperature in the fuel tank 60 at the time when the filling gas pressure Pi is maximum, namely the temperature in the fuel tank 60 at the time when the stored maximum pressure Pimax is detected, and the stored maximum pressure Pimax. In step S180, the CPU of the control unit 68 also calculates the amount of fuel gas in the fuel tank 60 at the start of fuel gas supply to the fuel cell 66, using the supply gas pressure Po detected in step S170 and the temperature in the fuel tank 60 at the time when this supply gas pressure Po is detected. The capacity of the fuel tank 60 is stored in advance in the control unit 68, and the CPU of the control unit 68 can calculate the amount of fuel gas in the fuel tank 60, specifically the amount of hydrogen in the fuel tank 60, from the pressure and temperature in the fuel tank 60 and the capacity of the fuel tank 60.

As described above, in step S180 of the fifth embodiment, the CPU of the control unit 68 calculates the amount of fuel gas in the fuel tank 60 at the start of fuel gas supply to the fuel cell 66 and the amount of fuel gas in the fuel tank 60 at the time when the filling gas pressure Pi is maximum, and determines that both the filling pressure sensor 41 and the high pressure sensor 42 are normal when the difference between the calculated amounts of fuel gas in the fuel tank 60 is equal to or smaller than a predetermined reference value. When the difference above is larger than the reference value, the CPU of the control unit 68 determines that there is a possibility that at least one of the filling pressure sensor 41 and the high pressure sensor 42 may be abnormal. The reference value is set in advance in view of the detection accuracy of the filling pressure sensor 41 and the high pressure sensor 42 and the detection accuracy of the temperature sensor 45. The reference value is set in advance to the maximum value of possible differences between the amount of fuel gas in the fuel tank 60 calculated when fuel gas supply to the fuel cell 66 is started after the fuel tank 60 is completely filled and the amount of fuel gas in the fuel tank 60 calculated using the detection value at the time when the filling gas pressure Pi is maximum and the fuel tank 60 is completely filled. The possible differences are the differences that can be obtained when both the filling pressure sensor 41 and the high pressure sensor 42 are normal.

The above amounts of fuel gas that are calculated to obtain the difference in step S180 of the present embodiment are the absolute amounts of fuel gas in the fuel tank 60 that are calculated using the pressure and temperature in the fuel tank 60. For example, these amounts of fuel gas may be calculated as the molar amounts of hydrogen in the fuel tank 60 or may be calculated as the weights of hydrogen in the fuel tank 60.

In addition to the effects similar to those of the above embodiments, this configuration improves accuracy of abnormality determination for the pressure sensors even when the period from time t3 when it is determined that the filling operation is finished to time t4 when the fuel cell system 25 is started thereafter is relatively long. As described above, when filling the fuel tank 60 with hydrogen, the temperature in the fuel tank 60 increases due to a phenomenon like adiabatic compression. After the filling operation is finished, the temperature in the fuel tank 60 gradually decreases due to heat dissipation etc. Accordingly, the pressure in the fuel tank 60 may decrease with the decrease in temperature in the fuel tank 60 while the fuel cell system 25 is stopped. In the fifth embodiment, the amounts of fuel gas in the fuel tank 60 are calculated and compared to determine whether the pressure sensors are normal. The configuration of the fifth embodiment thus reduces the influence of the decrease in pressure in the fuel tank 60 on the abnormality determination for the pressure sensors and improves accuracy of the determination.

F. Other Embodiments (F1) In the above embodiments, the fuel cell system 25 includes a single fuel tank 60. However, the fuel cell system 25 may include a plurality of fuel tanks 60. In this case, for example, the fuel tanks 60 are connected in parallel, and the operation of filling the fuel tank 60 with hydrogen and the operation of supplying hydrogen from the fuel tank 60 to the fuel cell 66 are simultaneously performed in all the fuel tanks 60. The filling pressure sensor 41 for detecting the filling gas pressure Pi and the flow rate sensor 47 for detecting the mass flow rate of hydrogen flowing through the filling pipe 30 are mounted on the filling pipe 30 at locations upstream of branches of the filling pipe 30 that are connected to the fuel tanks 60. The high pressure sensor 42 is mounted at a location upstream of the pressure reducing valve 54 and downstream of the location where pipes connected to the fuel tanks 60 merge into the single supply pipe 32.

For example, in the case where the configuration in which the fuel cell system 25 includes a plurality of fuel tanks 60 is applied to the fourth embodiment, the temperature sensor 45 may be provided for each of the fuel tanks 60, and the temperature increase rate $\Delta Tx$ may be monitored using the average of the detection values of all the temperature sensors 45. Alternatively, the temperature increase rate $\Delta Tx$ may be monitored using the detection value of the temperature sensor 45 for a specific one of the fuel tanks 60. It is only necessary to obtain in advance the relationship between the detection value of the temperature sensor 45 that is used and the pressure loss during filling and determine the reference rate $\Delta Txa$ using the obtained relationship.

(F2) The pressure loss during filling may be estimated by a method different from the second to fifth embodiments. Any physical quantity that changes during filling of the fuel tank 60 with hydrogen and that is a parameter having a certain relationship with the pressure loss may be used in a manner similar to that of the filling flow rate F, the pressure increase rate $\Delta Pi$, and the temperature increase rate $\Delta Tx$. For example, the time elapsed from the start of filling may be used in the case where filling conditions are determined in advance.

(F3) In the second to fifth embodiments, the reference flow rate Fa for the filling flow rate F (FIG. 4), the reference rate $\Delta Pia$ for the pressure increase rate $\Delta Pi$ (FIG. 7), and the reference rate $\Delta Txa$ for the temperature increase rate $\Delta Tx$ (FIG. 10) are determined based on the relationship with the pressure loss in order to determine when to start the abnormality detection control. However, the present disclosure may have a different configuration. The timing at which the measurement accuracy of the tank pressure by the filling pressure sensor 41 is sufficiently increased need only be determined in order to start the abnormality detection control. The relationship between the pressure loss and the filling flow rate F, the pressure increase rate $\Delta Pi$, and the temperature increase rate $\Delta Tx$ need not necessarily be obtained in advance in order to determine the reference that is used for the determination.

The present disclosure is not limited to the above embodiments and can be implemented with various configurations without departing from the spirit and scope of the present disclosure. For example, those technical features in the embodiments that correspond to the technical features in each form described in the section "SUMMARY" may be replaced or combined as appropriate in order to solve a part or all of the problems described above or to provide a part or all of the effects described above. Those technical features that are not described as essential in the specification can omitted as appropriate.

What is claimed is:
1. A fuel cell system, comprising:
a fuel cell;
a fuel tank that stores fuel gas to be supplied to the fuel cell;
a filling flow path through which the fuel gas to be supplied to the fuel tank flows;

a supply flow path connecting the fuel cell and the fuel tank;

a first pressure sensor that is mounted on the filling flow path and that detects a pressure in the filling flow path;

a second pressure sensor that is mounted on the supply flow path and that detects a pressure of the fuel gas at an outlet of the fuel tank;

a temperature sensor that detects a temperature in the fuel tank; and a control unit configured to perform abnormality detection control for the first pressure sensor and the second pressure sensor, wherein the control unit is configured to, in the abnormality detection control, obtain a maximum filling pressure from a detection value of the first pressure sensor, the maximum filling pressure being the pressure in the filling flow path at a maximum pressure time when the pressure in the filling flow path becomes maximum during filling of the fuel tank with the fuel gas;

determine that both the first pressure sensor and the second pressure sensor are normal when a first difference is equal to or smaller than a predetermined first reference value or when a second difference is equal to or smaller than a predetermined second reference value, the first difference being a difference between a supply start pressure and the maximum filling pressure, the supply start pressure being a detection value of the second pressure sensor at a start of supply of the fuel gas to the fuel cell that is when supply of the fuel gas from the fuel tank to the fuel cell is started for a first time after filling of the fuel tank with the fuel gas is finished, and the second difference being a difference between an amount of the fuel gas in the fuel tank at the start of supply of the fuel gas to the fuel cell, which is calculated using the temperature detected by the temperature sensor at the start of supply of the fuel gas to the fuel cell and the supply start pressure, and an amount of the fuel gas in the fuel tank at the maximum pressure time, which is calculated using the temperature detected by the temperature sensor at the maximum pressure time and the maximum filling pressure; and determine that there is a possibility that at least one of the first pressure sensor and the second pressure sensor are abnormal when the first difference is larger than the predetermined first reference value or when the second difference is larger than the predetermined second reference value.

2. The fuel cell system according to claim 1, further comprising:

a flow rate sensor that detects a flow rate of the fuel gas flowing through the filling flow path, wherein the control unit is configured to start the abnormality detection control once the flow rate detected by the flow rate sensor becomes equal to or lower than a predetermined reference flow rate after a start of filling of the fuel tank with the fuel gas.

3. The fuel cell system according to claim 2, wherein the reference flow rate is 30 g/sec.

4. The fuel cell system according to claim 1, wherein the control unit is configured to:

obtain a pressure increase rate of the filling flow path during filling of the fuel tank with the fuel gas by using the detection value of the first pressure sensor; and start the abnormality detection control once the pressure increase rate becomes equal to or lower than a predetermined first reference rate after the start of filling of the fuel tank with the fuel gas.

5. The fuel cell system according to claim 4, wherein the predetermined first reference rate is 23 MPa/min.

6. The fuel cell system according to claim 1, wherein the control unit is configured to:

obtain a temperature increase rate of the fuel tank during filling of the fuel tank with the fuel gas by using the temperature detected by the temperature sensor; and start the abnormality detection control after the temperature increase rate becomes equal to or lower than a predetermined second reference rate after the start of filling of the fuel tank with the fuel gas.

7. The fuel cell system according to claim 6, wherein the predetermined second reference rate is 20° C./min.

8. The fuel cell system according to claim 1, wherein the control unit is configured to obtain the maximum filling pressure at the maximum pressure time, the maximum pressure time being a time when the detection value of the first pressure sensor becomes maximum after a pressure loss that occurs between the first pressure sensor and the fuel tank when the fuel gas flows through the filling flow path is estimated to become equal to or lower than a predetermined determination value.

9. A method for detecting an abnormality of a fuel cell system, the fuel cell system including a fuel cell, a fuel tank that stores fuel gas to be supplied to the fuel cell, a filling flow path through which the fuel gas to be supplied to the fuel tank flows, a supply flow path connecting the fuel cell and the fuel tank, a first pressure sensor that is mounted on the filling flow path and that detects a pressure in the filling flow path, and a second pressure sensor that is mounted on the supply flow path and that detects a pressure of the fuel gas at an outlet of the fuel tank, the method comprising:

obtaining a maximum filling pressure from a detection value of the first pressure sensor, the maximum filling pressure being the pressure in the filling flow path at a maximum pressure time when the pressure in the filling flow path becomes maximum during filling of the fuel tank with the fuel gas;

determining that both the first pressure sensor and the second pressure sensor are normal when a first difference is equal to or smaller than a predetermined first reference value or when a second difference is equal to or smaller than a predetermined second reference value, the first difference being a difference between a supply start pressure and the maximum filling pressure, the supply start pressure being a detection value of the second pressure sensor at a start of supply of the fuel gas to the fuel cell that is when supply of the fuel gas from the fuel tank to the fuel cell is started for a first time after filling of the fuel tank with the fuel gas is finished, and the second difference being a difference between an amount of the fuel gas in the fuel tank at the start of supply of the fuel gas to the fuel cell, which is calculated using a temperature in the fuel tank at the start of supply of the fuel gas to the fuel cell and the supply start pressure, and an amount of the fuel gas in the fuel tank at the maximum pressure time, which is calculated using a temperature in the fuel tank at the maximum pressure time and the maximum filling pressure; and determining that there is a possibility that at least one of the first pressure sensor and the second pressure sensor are abnormal when the first difference is larger than the predetermined first reference value or when the second difference is larger than the predetermined second reference value.

* * * * *